Jan. 20, 1942.　　　H. T. AVERY　　　2,270,573
CALCULATING MACHINE
Filed April 12, 1940　　　21 Sheets-Sheet 1

INVENTOR
HAROLD T. AVERY
BY
ATTORNEY

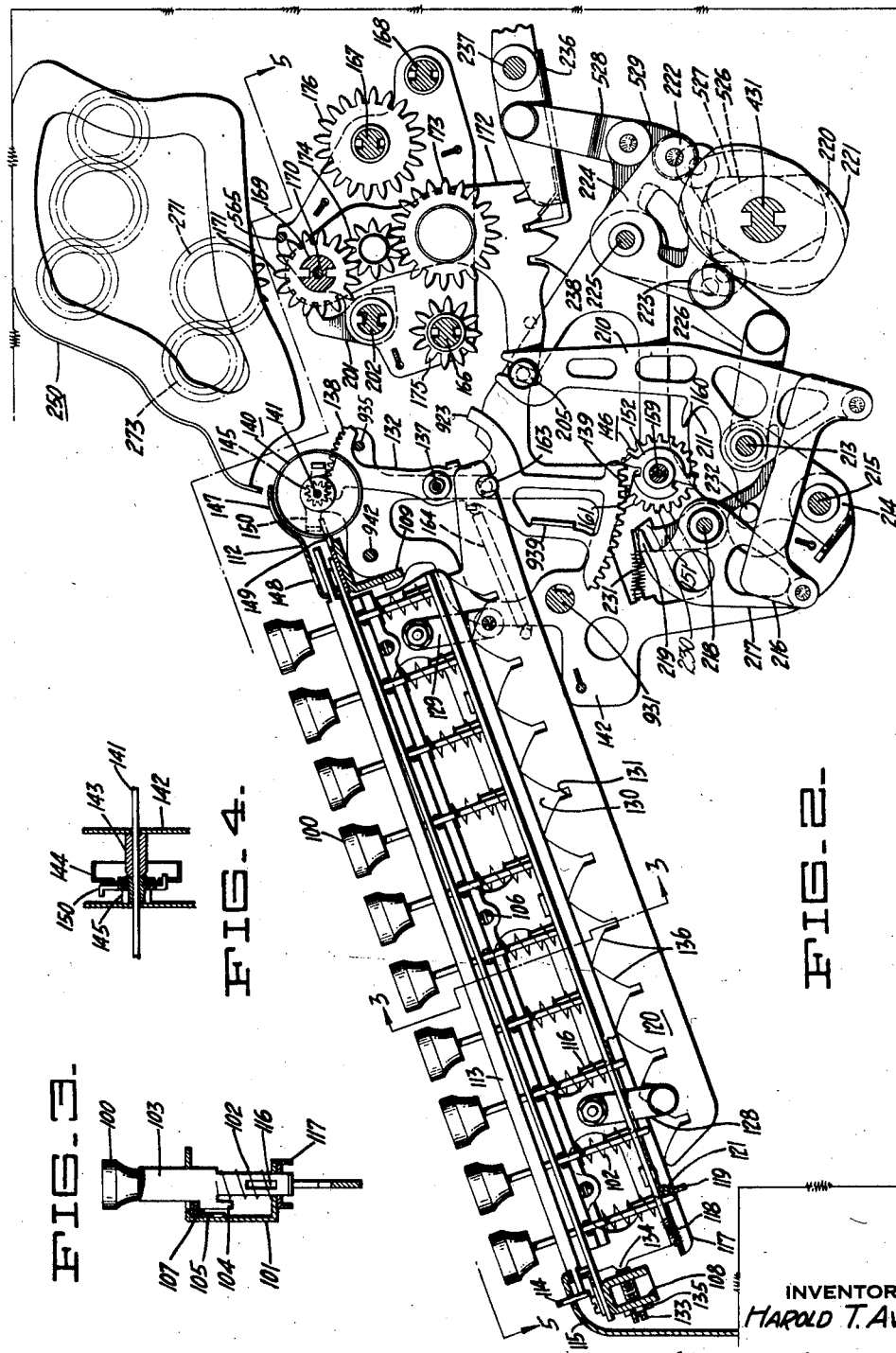

Jan. 20, 1942.                H. T. AVERY                    2,270,573
                         CALCULATING MACHINE
                         Filed April 12, 1940          21 Sheets-Sheet 3
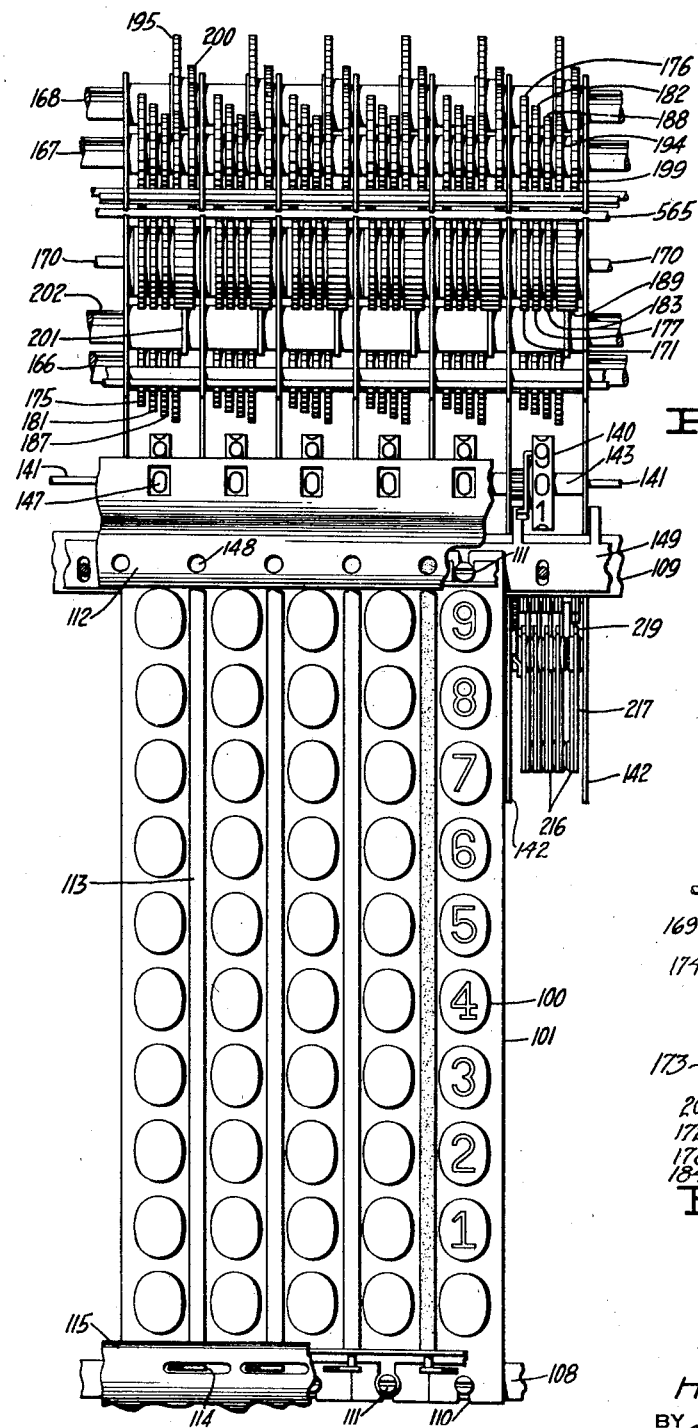
FIG_5_
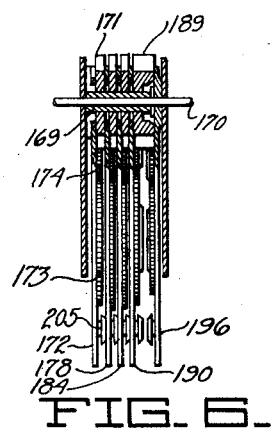
FIG_6_
INVENTOR
HAROLD T. AVERY
BY
ATTORNEY Jan. 20, 1942.  H. T. AVERY  2,270,573
CALCULATING MACHINE
Filed April 12, 1940  21 Sheets-Sheet 4

INVENTOR
HAROLD T. AVERY
BY
ATTORNEY

Jan. 20, 1942.  H. T. AVERY  2,270,573
CALCULATING MACHINE
Filed April 12, 1940  21 Sheets-Sheet 5
FIG_9_
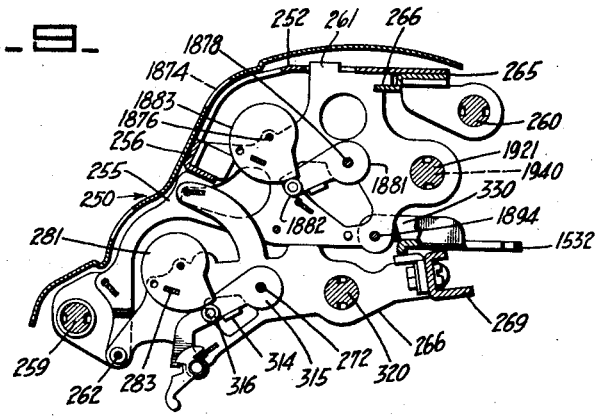
FIG_10_
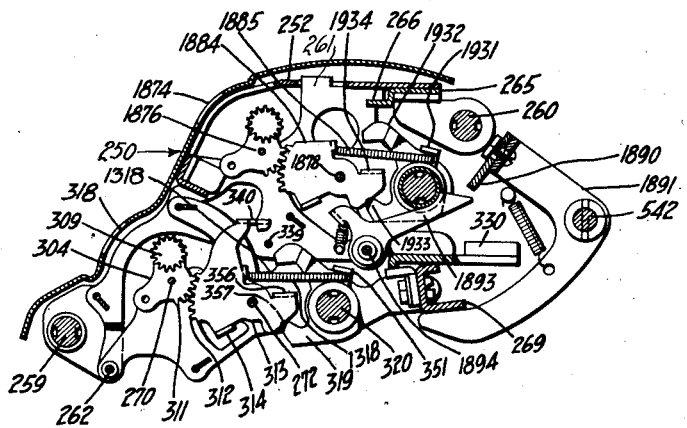
INVENTOR
HAROLD T. AVERY
BY
ATTORNEY Jan. 20, 1942.     H. T. AVERY     2,270,573

CALCULATING MACHINE

Filed April 12, 1940     21 Sheets-Sheet 6

INVENTOR
HAROLD T. AVERY
BY
ATTORNEY

Jan. 20, 1942. H. T. AVERY 2,270,573
CALCULATING MACHINE
Filed April 12, 1940 21 Sheets-Sheet 7

INVENTOR.
HAROLD T. AVERY
BY
ATTORNEY

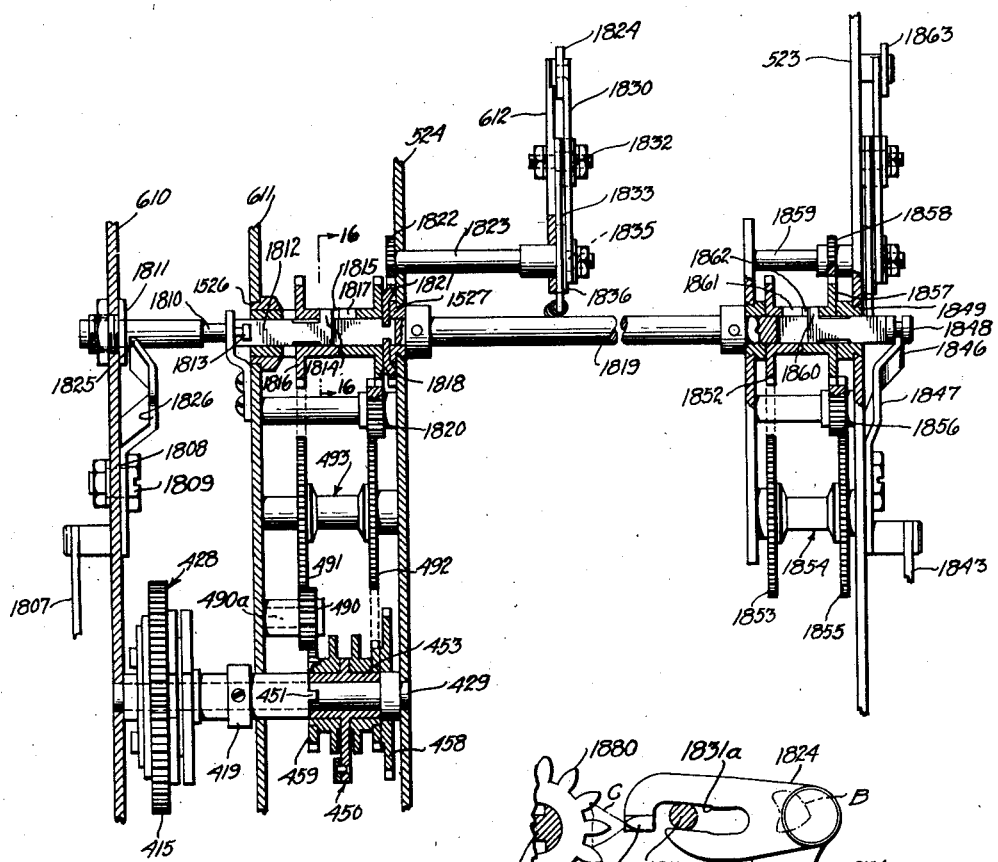
FIG.15.
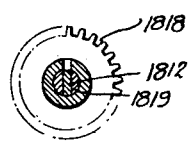
FIG.16.
FIG.17.
INVENTOR.
HAROLD T. AVERY
BY 
ATTORNEY Jan. 20, 1942.  H. T. AVERY  2,270,573
CALCULATING MACHINE
Filed April 12, 1940  21 Sheets-Sheet 9
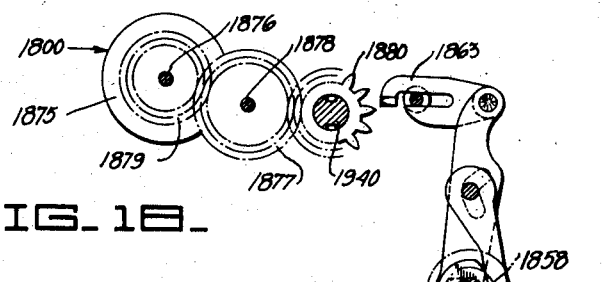
FIG_18_
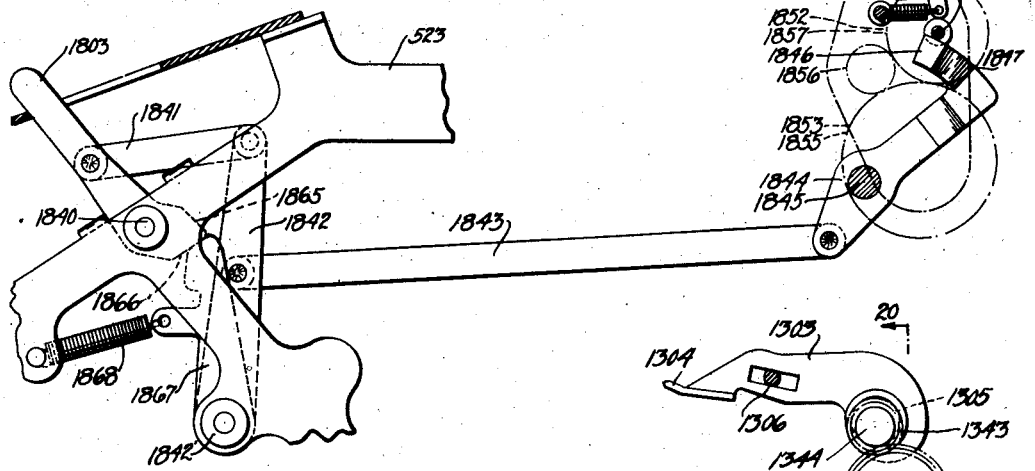
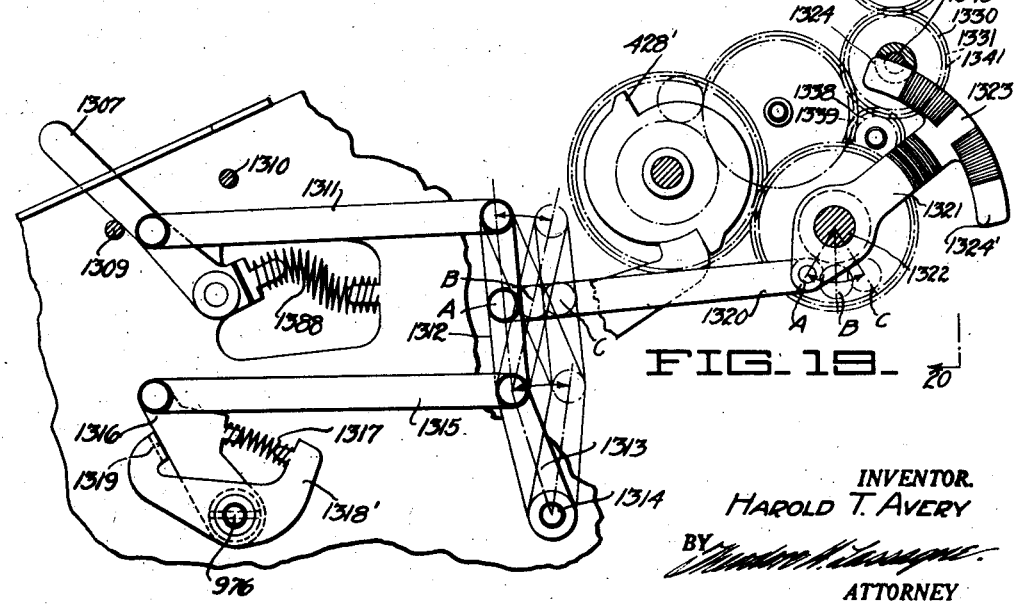
FIG_19_
INVENTOR.
HAROLD T. AVERY
BY
ATTORNEY

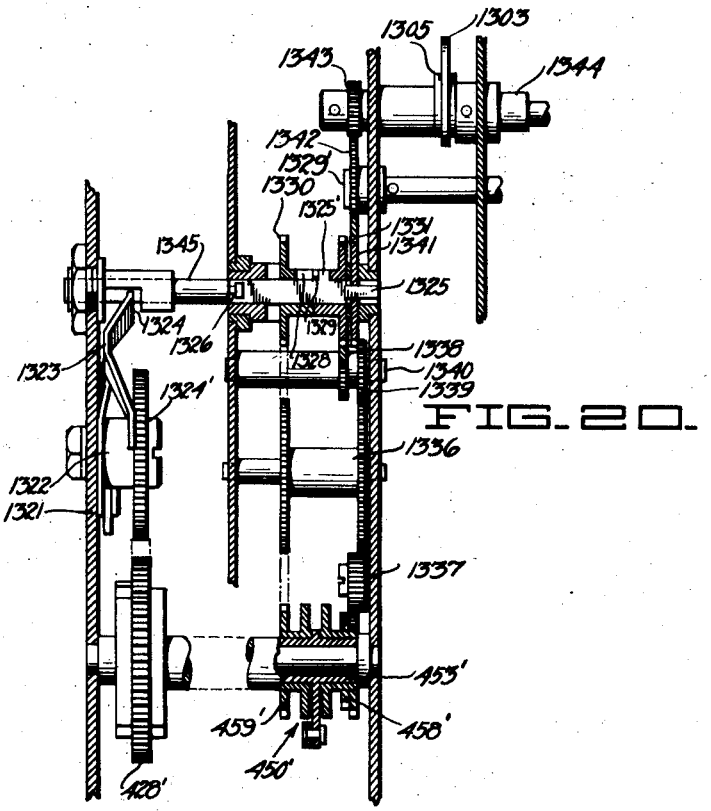
FIG. 20.
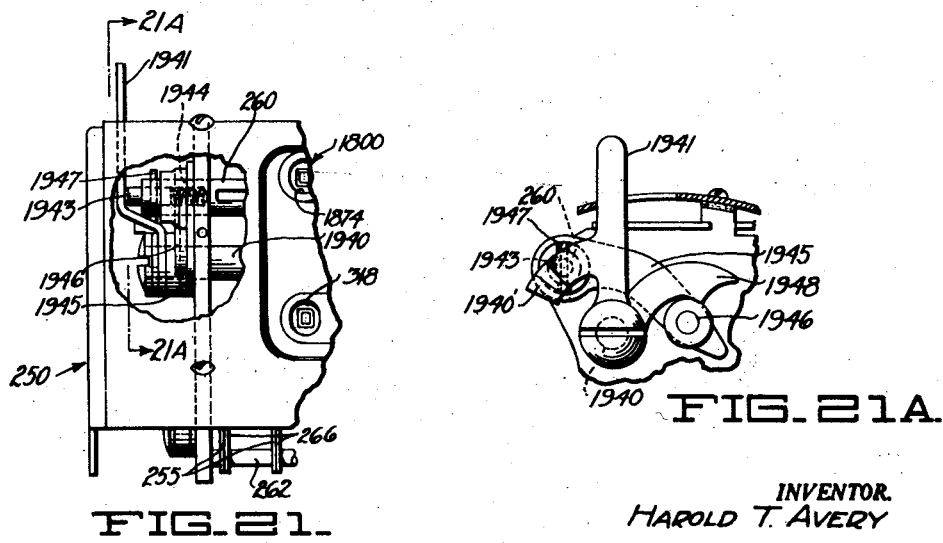
FIG. 21.
FIG. 21A.
INVENTOR.
HAROLD T. AVERY
ATTORNEY Jan. 20, 1942.   H. T. AVERY   2,270,573
CALCULATING MACHINE
Filed April 12, 1940      21 Sheets-Sheet 11
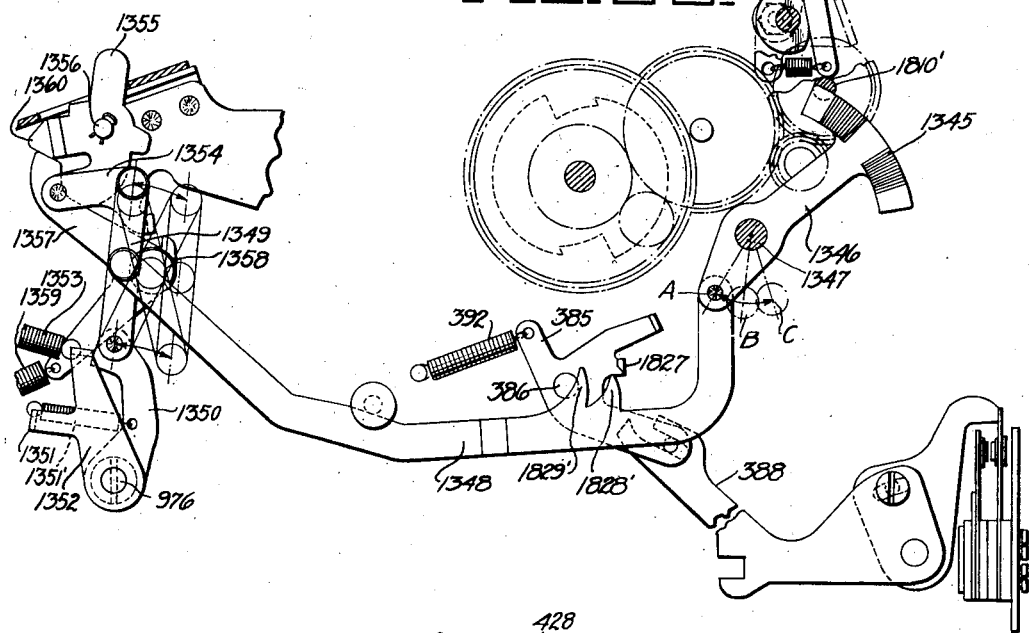
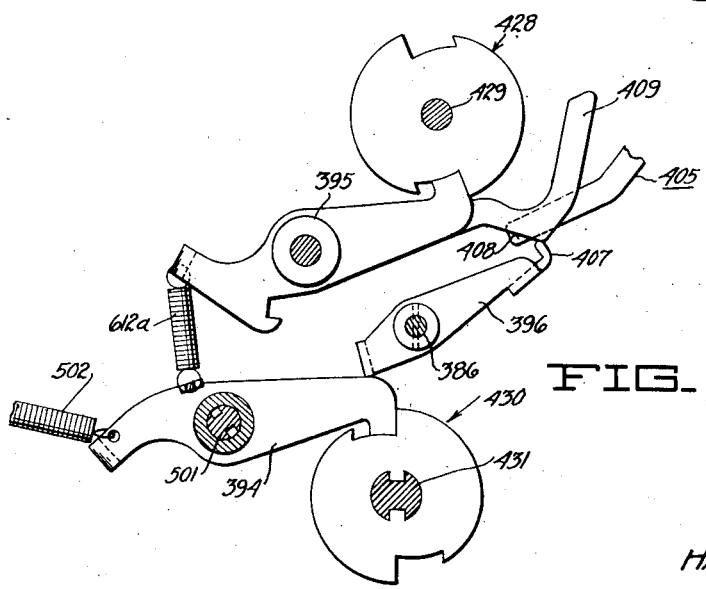
INVENTOR.
HAROLD T. AVERY
BY
ATTORNEY

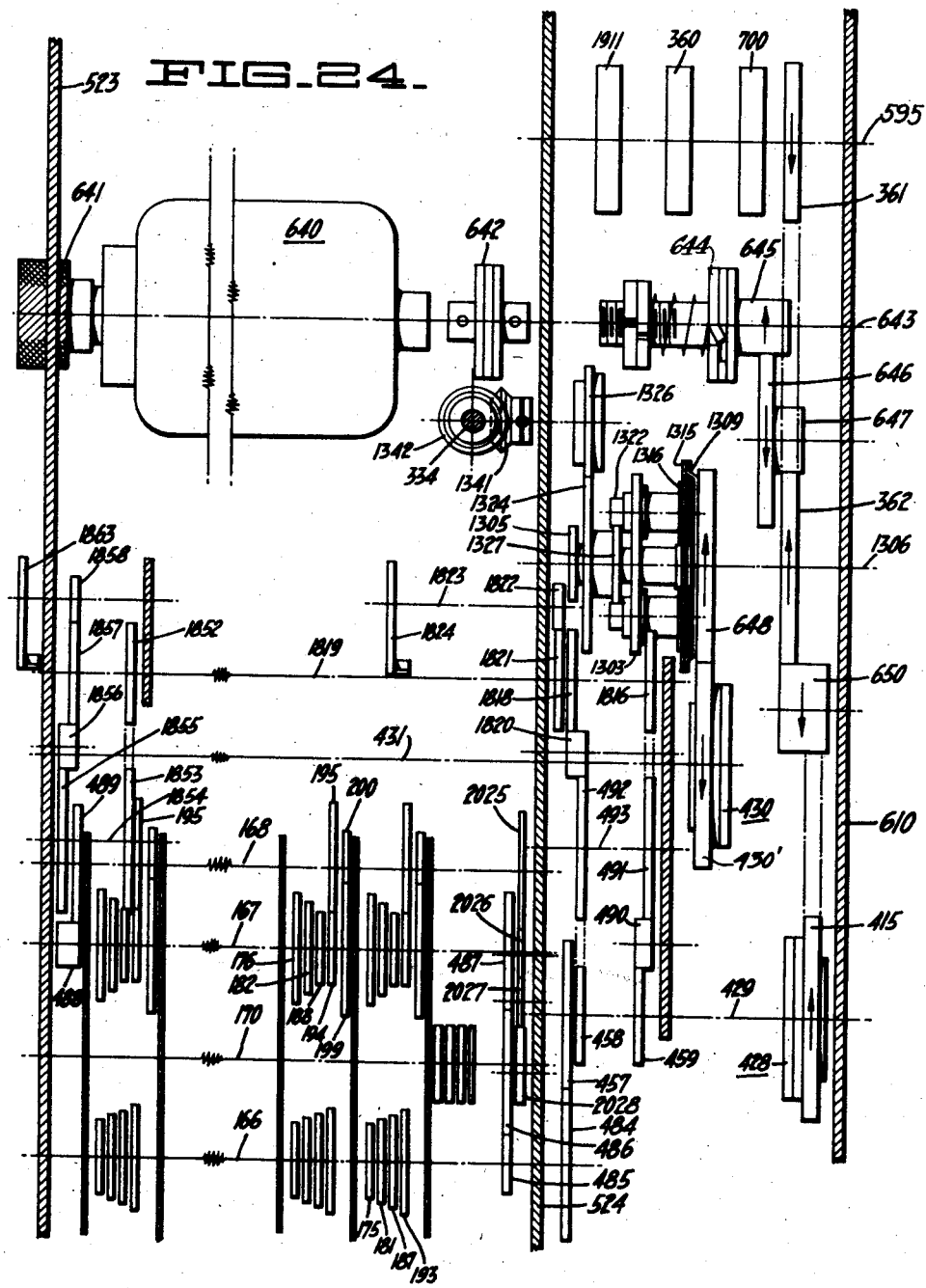

Jan. 20, 1942.　　　H. T. AVERY　　　2,270,573
CALCULATING MACHINE
Filed April 12, 1940　　　21 Sheets-Sheet 13
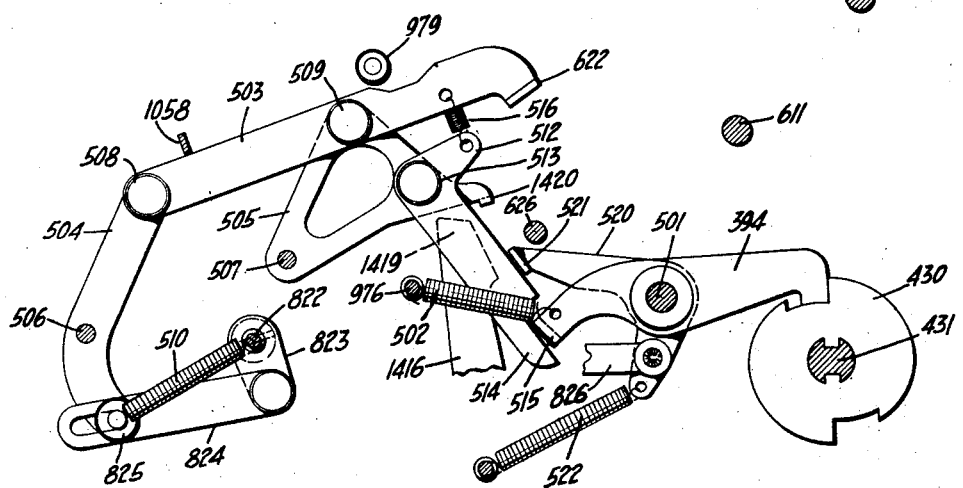
FIG_25_
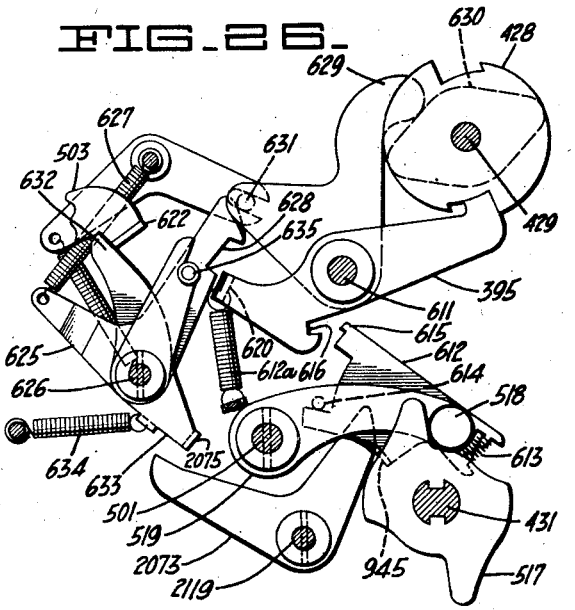
FIG_26_
INVENTOR
HAROLD T. AVERY
BY
ATTORNEY Jan. 20, 1942.   H. T. AVERY   2,270,573
CALCULATING MACHINE
Filed April 12, 1940   21 Sheets-Sheet 14
FIG_27_
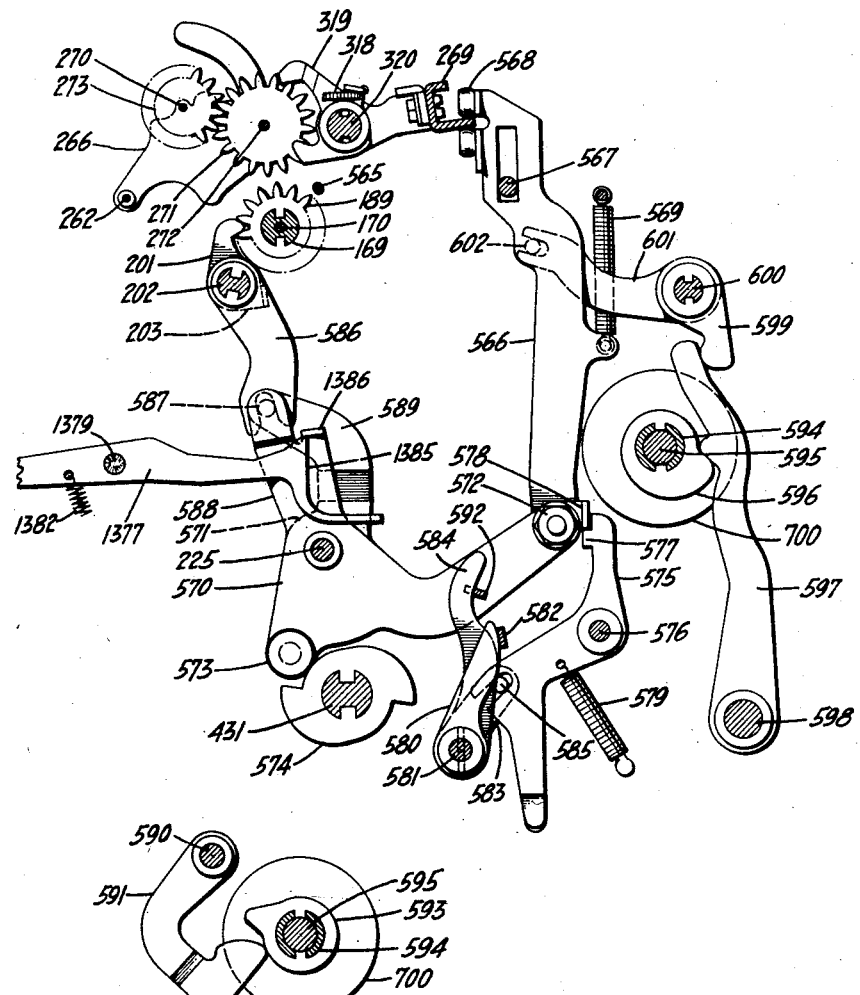
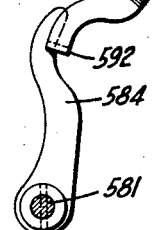
FIG_28_
INVENTOR
HAROLD T. AVERY
BY
ATTORNEY Jan. 20, 1942.  H. T. AVERY  2,270,573
CALCULATING MACHINE
Filed April 12, 1940   21 Sheets-Sheet 15

INVENTOR
HAROLD T. AVERY
BY
ATTORNEY

Jan. 20, 1942.　　　　H. T. AVERY　　　　2,270,573
CALCULATING MACHINE
Filed April 12, 1940　　　　21 Sheets-Sheet 16
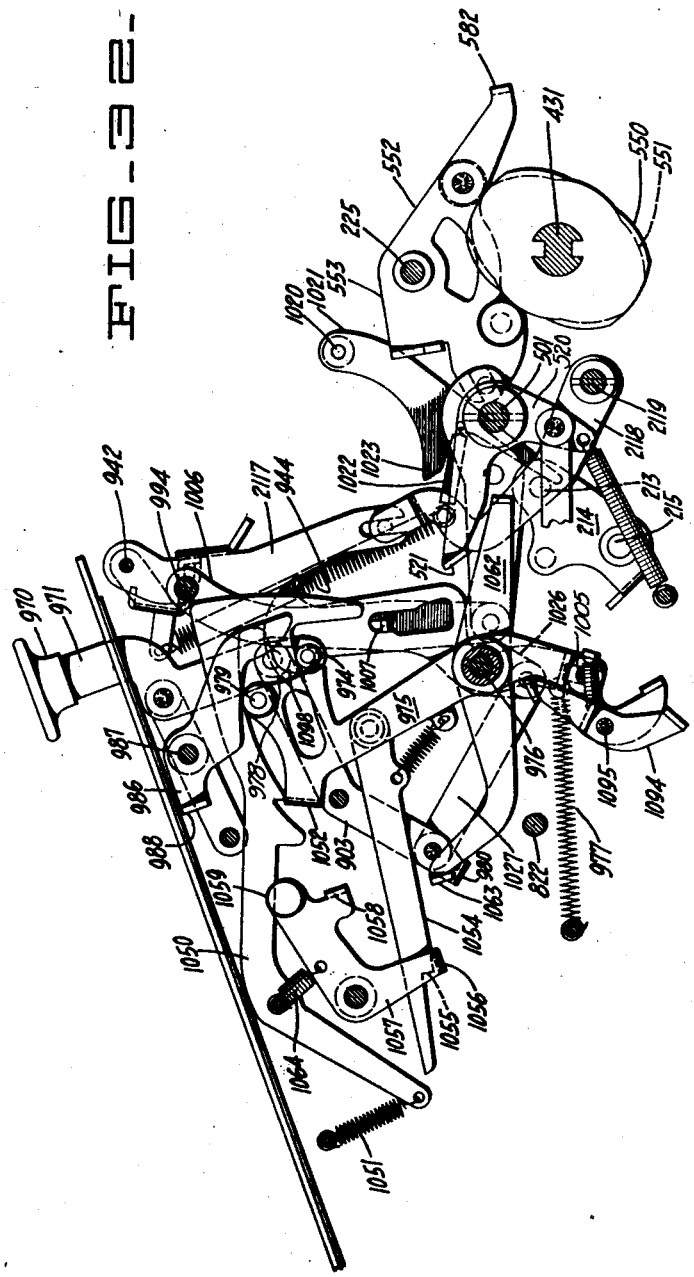
INVENTOR
HAROLD T. AVERY
BY
ATTORNEY Jan. 20, 1942.　　　H. T. AVERY　　　2,270,573
CALCULATING MACHINE
Filed April 12, 1940　　21 Sheets-Sheet 17
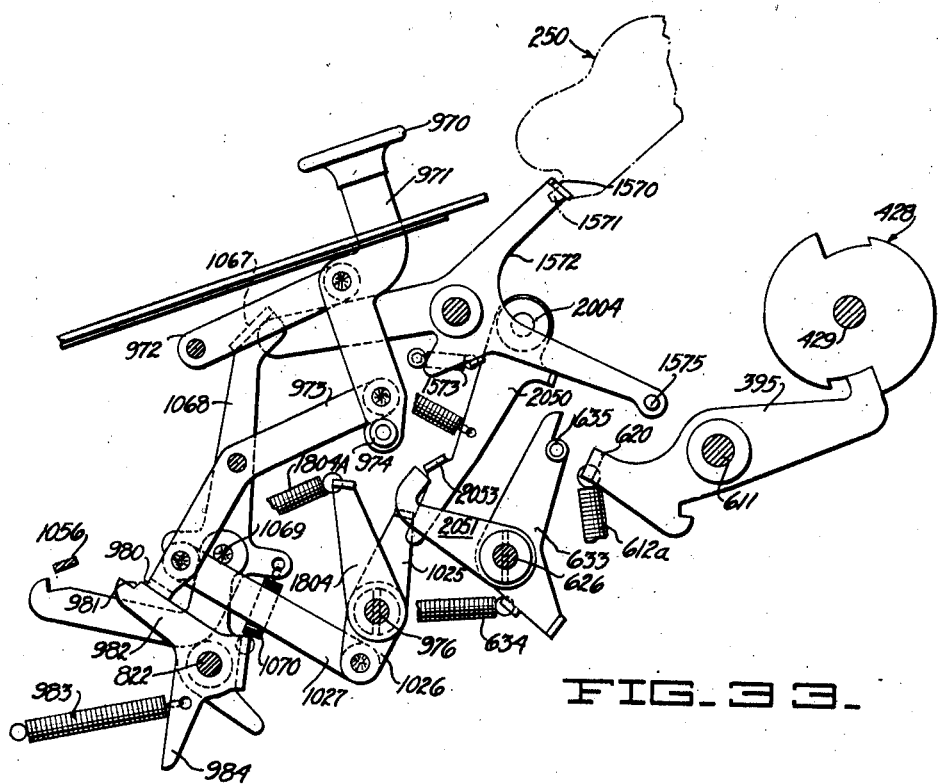
FIG_33_
INVENTOR.
HAROLD T. AVERY
BY 
ATTORNEY Jan. 20, 1942.   H. T. AVERY   2,270,573
CALCULATING MACHINE
Filed April 12, 1940   21 Sheets-Sheet 18
FIG. 34.
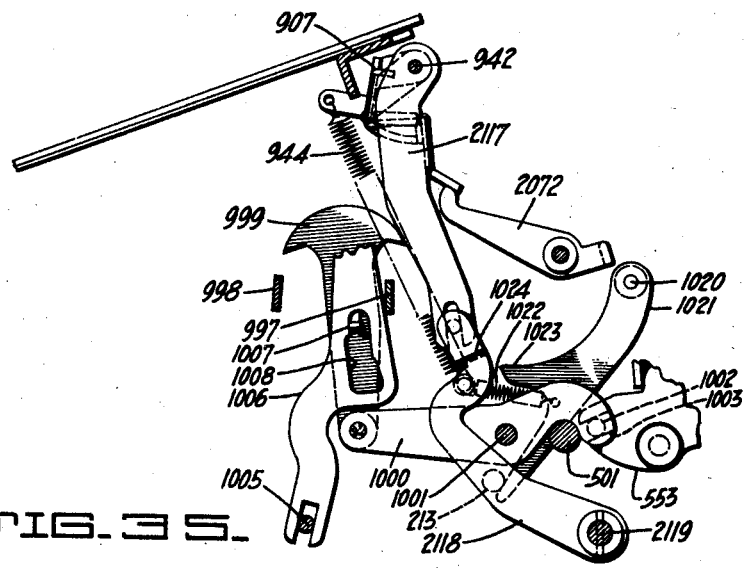
FIG. 35.
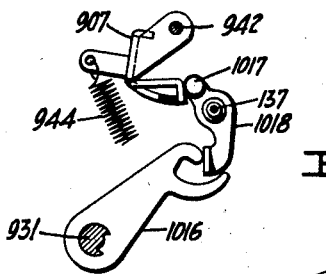
FIG. 37.
FIG. 36.
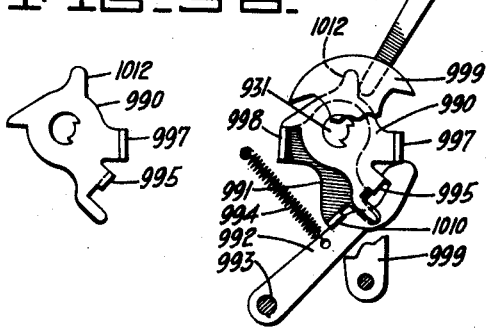
FIG. 38.
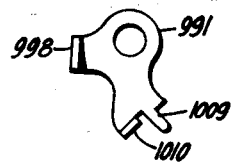
INVENTOR
HAROLD T. AVERY
BY 
ATTORNEY Jan. 20, 1942. H. T. AVERY 2,270,573
CALCULATING MACHINE
Filed April 12, 1940 21 Sheets-Sheet 19
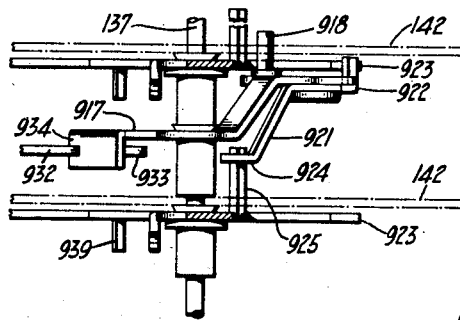
FIG_39_
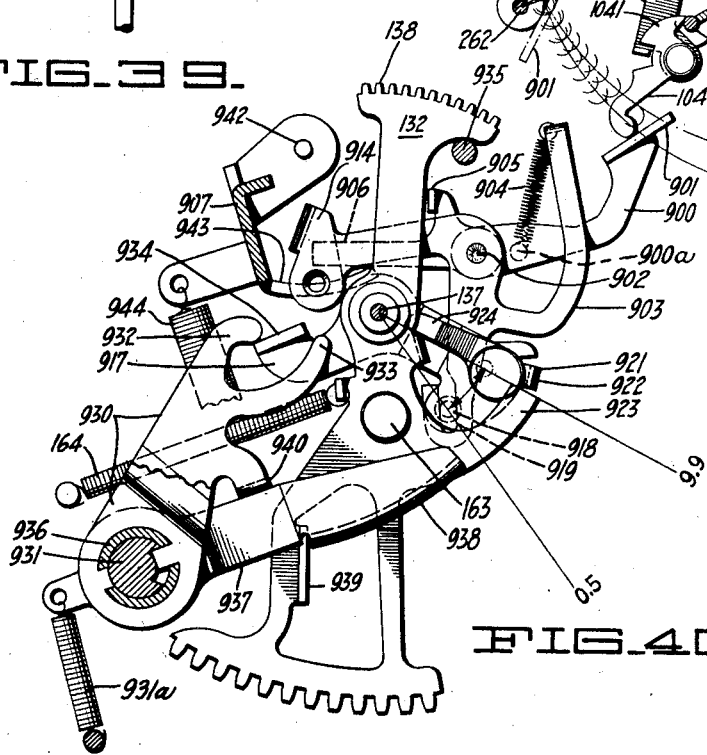
FIG_40_
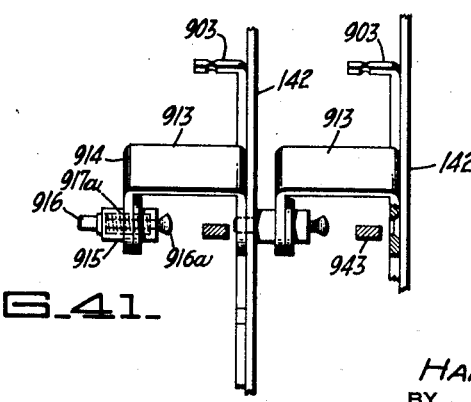
FIG_41_
INVENTOR
HAROLD T. AVERY
BY
ATTORNEY

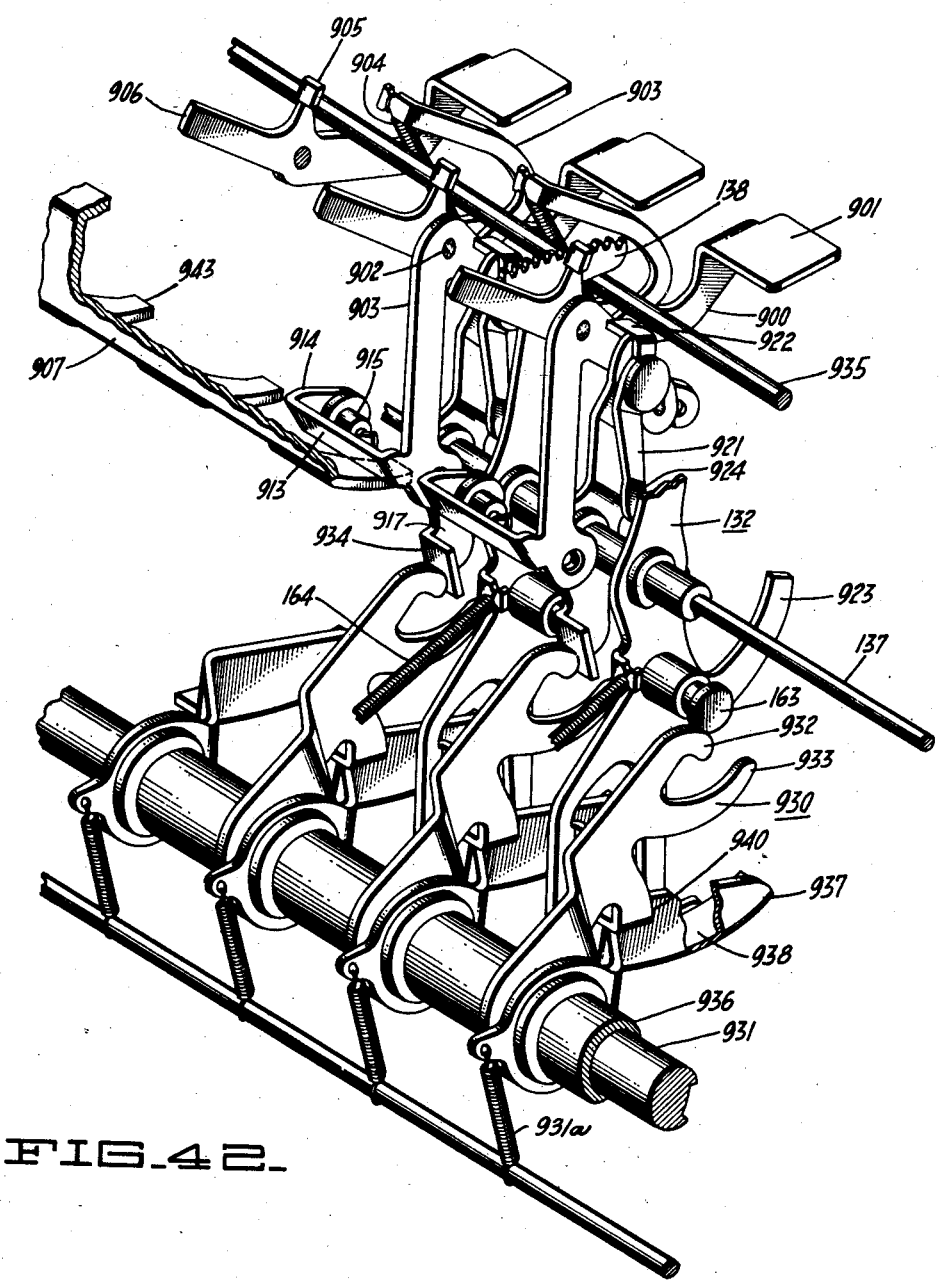

Jan. 20, 1942.    H. T. AVERY    2,270,573
CALCULATING MACHINE
Filed April 12, 1940    21 Sheets-Sheet 21

INVENTOR
HAROLD T. AVERY
BY
ATTORNEY

Patented Jan. 20, 1942

2,270,573

UNITED STATES PATENT OFFICE 2,270,573

CALCULATING MACHINE

Harold T. Avery, Oakland, Calif., assignor to Marchant Calculating Machine Company, a corporation of California Application April 12, 1940, Serial No. 329,281

12 Claims. (Cl. 235—79)

This invention relates to calculating machines and the like having registering means to display factors and results of calculations, and has particular reference to a machine of this class wherein the registering means may be set to display the result of a calculation in different terms; for example, as a true figure or as a complement.

One object of the invention is to obviate the necessity for manual setting of counter register controls when changing from a division calculation to a multiplication, or other calculation, or vice versa.

Another object is to concurrently obtain a positive result of a calculation and a complement of that result.

Another object is to concurrently register both a single multiplier or quotient and accumulated multipliers or quotients.

Another object is to selectively obtain positive or negative counts of either additive or subtractive machine operations.

Another object is to enable manual setting of a reversible counting register for a calculating machine and thereafter to automatically change this setting in accordance with the character of calculation being performed.

Another object is to provide a machine having a control member manually settable into different positions to selectively control the direction of operation of a counter register and means for automatically changing such direction of operation without disturbing the setting of such member.

Another object is to prevent a change of direction of operation of a register until the end of the calculation operation.

The manner in which the above and other objects of the invention are accomplished will be readily understood on reference to the following specification when read in conjunction with the accompanying drawings, wherein:

Figure 2 is a section in side elevation, illustrating the keyboard for selecting a value, and a portion of the actuator mechanism.

Figure 3 is a section taken along the line 3—3 of Figure 2, showing the typical construction and mounting of a key.

Figure 4 is a sectional detail of a check dial.

Figure 5 is a section taken generally along the line 5—5 of Figure 2, illustrating the arrangement of the keyboard and the actuator mechanism.

Figure 6 is a section taken through the five selection plates in one of the decimal orders.

Figures 7, 8, 9, and 10 are sections taken through the carriage to illustrate the construction of the accumulator and counter mechanisms, the sections being taken so as to bring out the interaction and relationship between certain of the parts.

Figure 11:
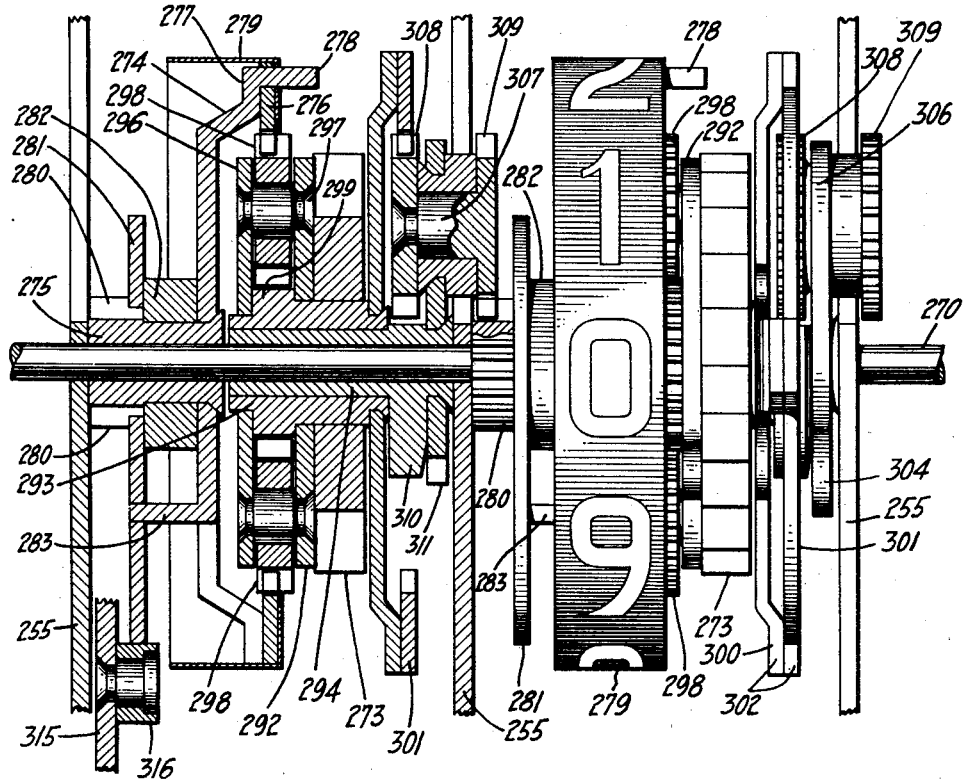

Figure 11 is a front elevation, partly in section, of two dial assemblies, illustrating the manner of construction thereof.

Figure 12:
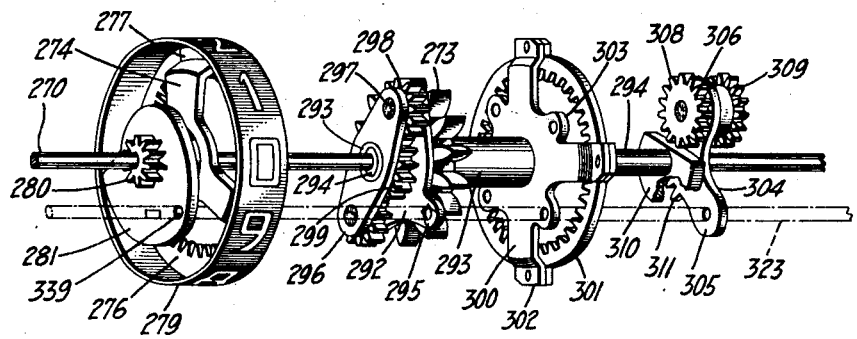

Figure 12 is an exploded perspective view of the dial assembly.

Figure 13:
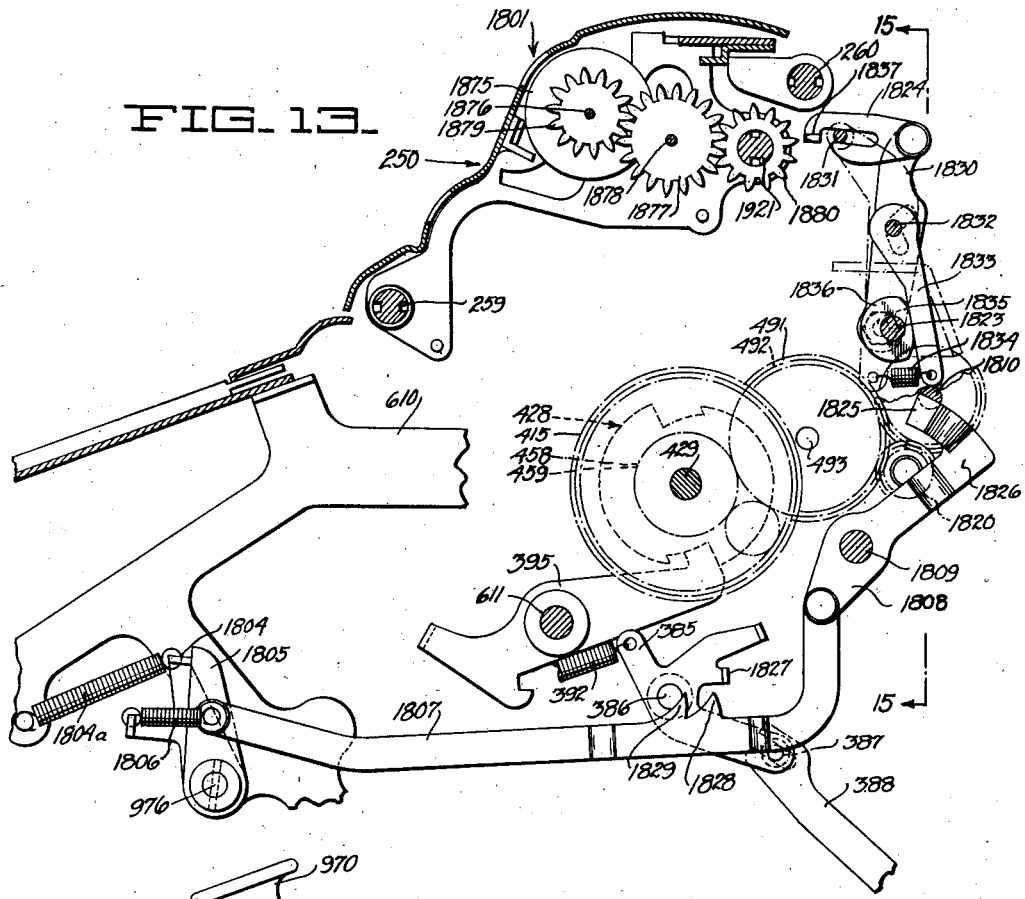

Figure 13 is a side elevation, partly in section, of the counter control and counter actuating mechanisms utilized in connection with the right hand counter register.

Figure 14:
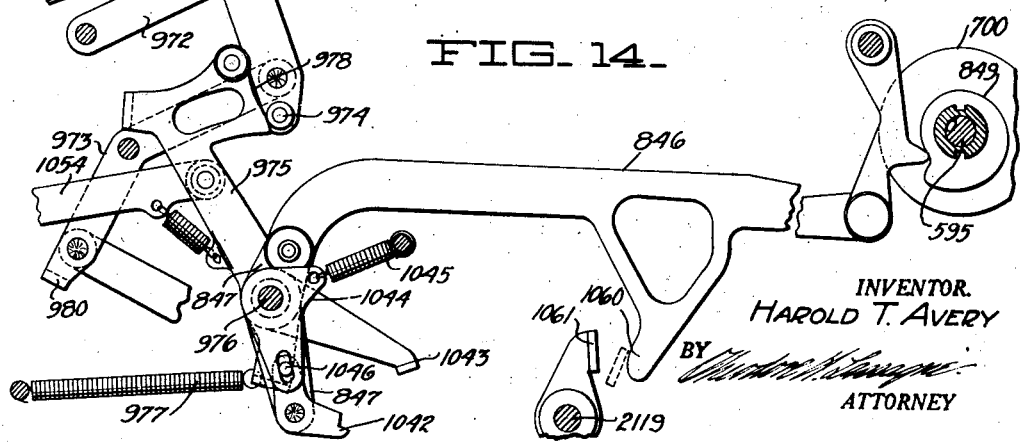

Figure 14 is a side elevation showing the restore clutch and parts of the division controlling mechanism operated thereby.

Figure 15 is a rear view taken substantially along the line 15—15 of Figure 13, illustrating the counter control mechanism and counter actuating mechanism for both the left and right hand counter registers.

Figure 16 is a section taken along line 16—16 of Figure 15.

Figure 17 is a detail view of the counter operating mechanism illustrating its movement diagrammatically.

Figure 18 is a side elevation, partly in section, of the counter control mechanism and counter actuating mechanism utilized in connection with the left hand counter register.

Figure 19 is a side elevation, partly in section, of a modified form of counter control mechanism and counter actuating mechanisms.

Figure 20 is a rear elevation taken substantially along the line 20—20 of Figure 19.

Figure 21 is a front view of the left hand portion of the carriage, with parts broken away, illustrating the clutching means for selectively driving the left hand counter register.

Figure 21A is a section taken along the line 21A—21A of Figure 21.

Figure 22 is a side elevation, partly in section of still another modified form of counter control mechanism utilized in connection with the counter actuating mechanism illustrated in Figure 13.

Figure 23 is a side elevation illustrating part of the motor circuit controlling mechanism associated with the main clutch, the setting clutch, and the restore clutch.

Figure 24 is a schematic view showing the var-

Figure 25 is a side elevation of the mechanism for controlling operation of the setting clutch.

Figure 26 is a side elevation of the mechanism for controlling operation of the main clutch.

Figure 27 is a side elevation, partly in section, illustrating the carriage dipping mechanism, and certain mechanism utilized in connection with the shift operation of the carriage.

Figure 28 illustrates certain details of the mechanism utilized in connection with the carriage dipping mechanism.

Figure 29:
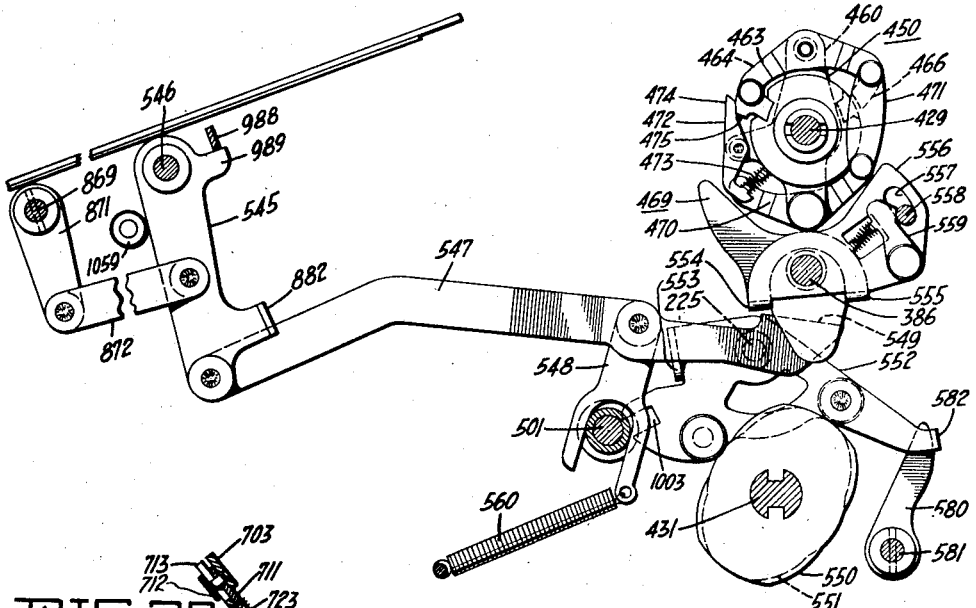

Figure 29 is a side view of the reverse control unit and its controlling mechanism.

Figure 30:
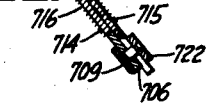
Figure 31:
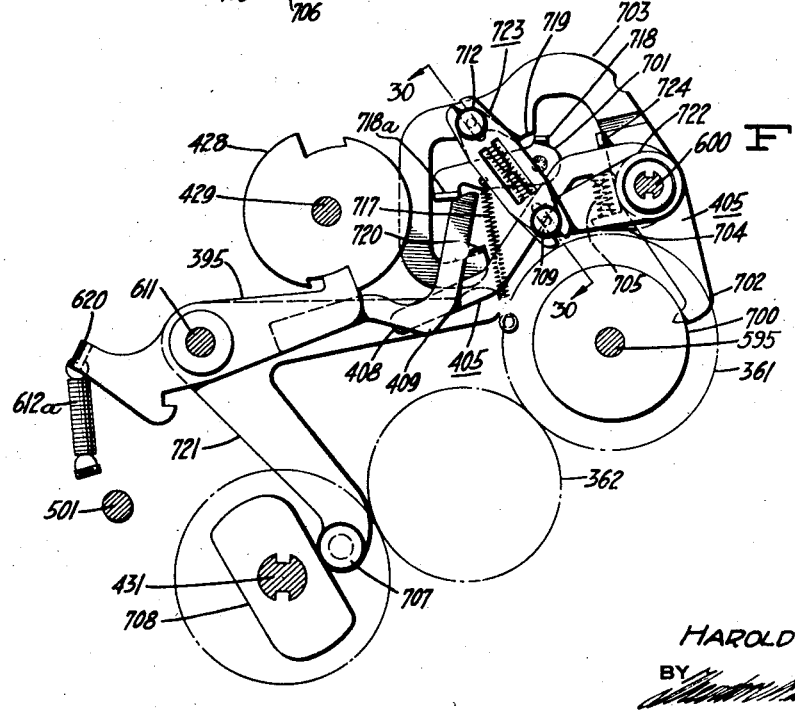

Figure 30 is a section taken on the line 30—30 of Figure 31 illustrating the construction of a spring link.

Figure 31 is a detail view showing the restore clutch and mechanism for controlling this clutch.

Figure 32 is a side elevation showing certain of the division control mechanisms.

Figure 33 is a side elevation showing certain of the division control mechanisms.

Figure 34 is a detail view illustrating the control of the division sensing mechanism and the division gate.

Figure 35 is a fragmentary view illustrating certain mechanism utilized for rocking out the division gate.

Figure 36 is a detail of a member utilized in controlling the shaft controlling certain of the division mechanisms.

Figure 37 illustrates, in side elevation, mechanism for preventing the shift of the carriage during a division operation, as well as certain mechanisms for operating the shaft which controls a portion of the division mechanism.

Figure 38 is a detail of a member utilized in connection with the locking of the aforementioned shaft.

Figure 39 is a plan view illustrating a portion of the division mechanism; particularly the means for transmitting from a lower order to the next higher order the decimal value of the value set in the lower order.

Figure 40 is a side elevation illustrating the relation of the division sensing mechanism to the accumulator mechanism, and the controls therefor.

Figure 41 is a fragmentary view showing the manner of supporting certain portions of the division mechanism between the base plates of the machine.

Figure 42 is a perspective view illustrating certain of the division sensing mechanism, and its controls.

Figure 43:
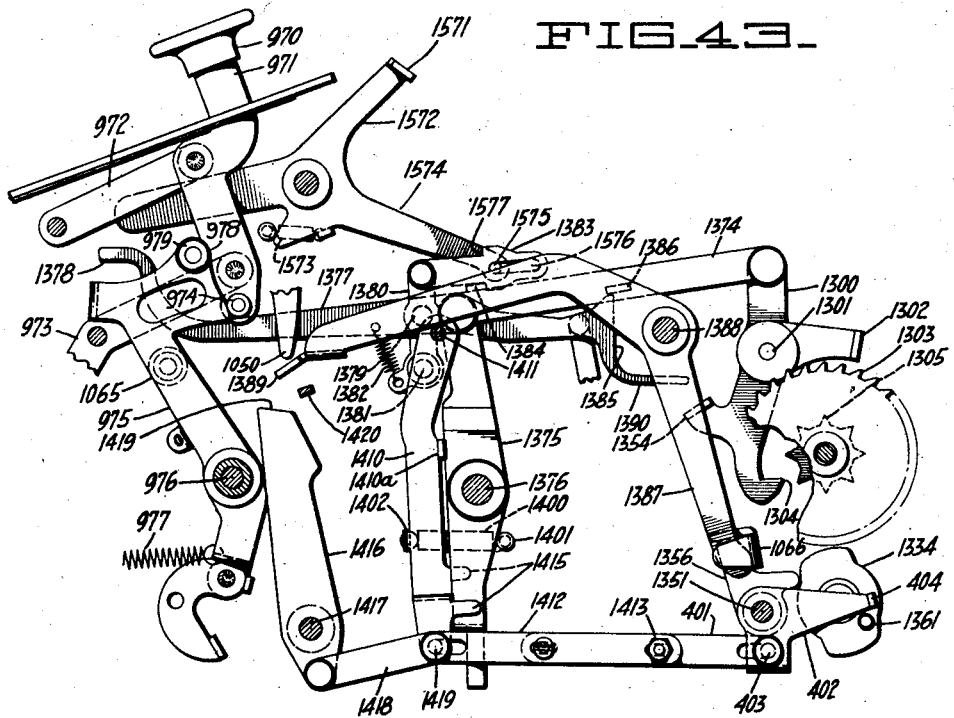

Figure 43 is a side elevation illustrating the controls utilized in connection with automatic carriage shifting.

Figures 44, 45:
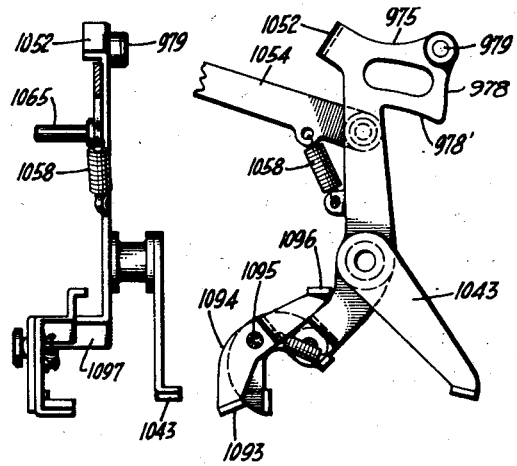

Figure 44 is a detail view, in end elevation, of one of the division control members.

Figure 45 is a detail view, in side elevation, of said member.

The present application is a continuation-in-part of each of the following copending applications of Avery; Serial Number 653,207, filed January twenty-third, 1923, entitled "Calculating machines," and since matured into Patent Number 2,229,630, issued on January twenty-eighth, 1941; Serial Number 702,949, filed December eighteenth, 1933, entitled "Calculating machines," and since matured into Patent Number 2,211,736, issued on August thirteenth, 1940; and Serial Number 84,927, filed June sixth, 1936, entitled "Calculating machine." Reference is hereby made to the above copending applications for a disclosure of a complete calculating machine in which the present invention is embodied. However, it is to be understood that the invention may also be embodied in machines of different construction.

The invention obviates the necessity for the calculating machine operator to change the direction of operation of a counter register when changing the operation of the machine from a division calculation to a multiplication calculation, or vice versa, in the event that he desires to obtain true quotients and true multipliers in either case. However, the invention also enables complementary quotients or multipliers to be obtained if desired, and, furthermore, enables true and complementary quotients or multipliers to be simultaneously obtained.

The machine to which the present invention is applied utilizes the well known "tear down" method of division calculation, wherein the divisor is subtracted as many times as possible from the dividend to obtain the quotient. The first quotient figure is derived by subtracting the divisor as many times as possible from the highest series of denominational orders of the dividend in which the divisor is contained, the second quotient figure, by subtracting it from the highest remaining series of orders in which it is obtained, and so on.

This method of determining the quotient is generally carried out by setting up the dividend in a series of dials in an accumulator register mounted on a shiftable carriage, while setting up the divisor in a series of keys in a keyboard. The carriage, or the accumulator register actuating mechanism is so positioned relative to the various keys depressed on the keyboard, or vice versa, that on beginning the multiple subtraction process, the divisor will be subtracted from the highest series of register dial orders into which it can be contained, thereby deriving the first quotient figure which appears on a suitable counter. Thereafter, the carriage is automatically shifted one order to the left, which has the same effect as multiplying the remainder by ten, and the same procedure of deriving the next lower order quotient figure is followed through.

MANUALLY SET SELECTION MECHANISM

The machine disclosed in the above identified Avery patents and application is of the key set type in which means are provided for first setting one factor of a calculation upon a keyboard or equivalent mechanism, and subsequently operating the machine in a manner indicated by the character and amount of another factor of the calculation The mechanism for setting up the first factor may be considered as comprising a manually operated and a power operated portion, the manually operated portion being designed to be moved to a selected controlling position by the depression of keys or the setting of equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard.

Figure 1:
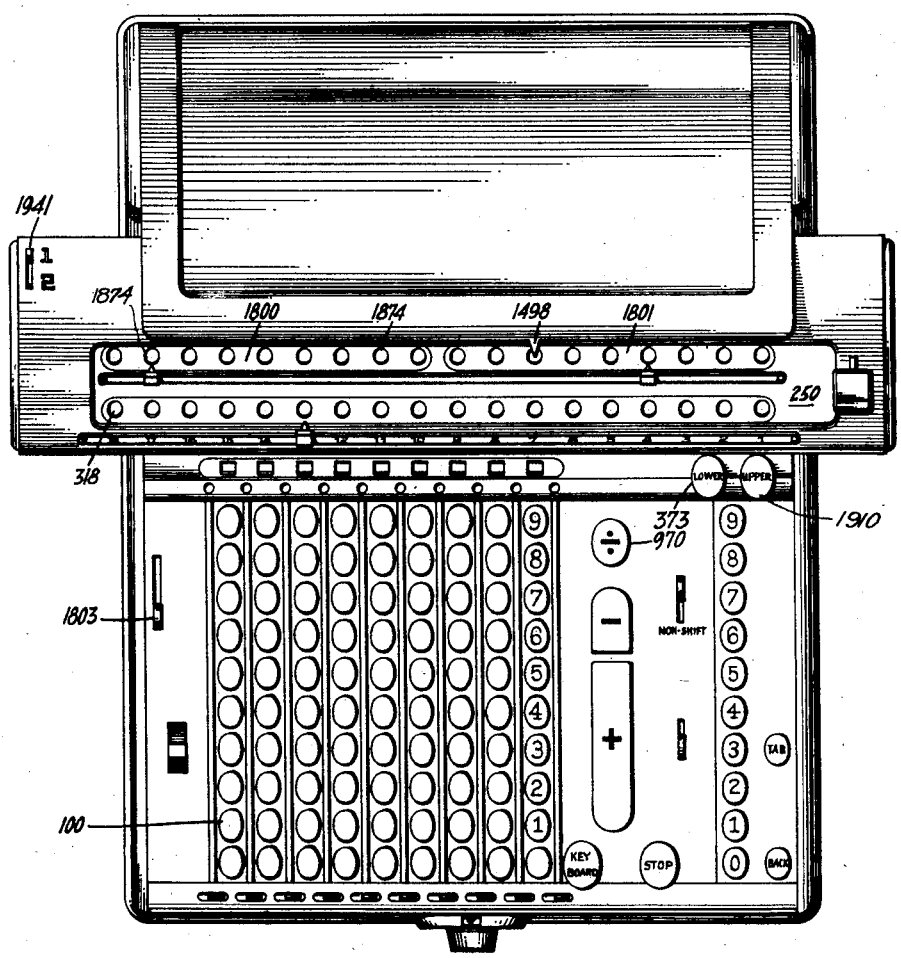
Figure 1 is a plan view of the machine in which the present invention is incorporated.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

The construction of one bank of keys is shown in Figures 2 and 3 of the drawings and is disclosed and claimed in the copending Avery application Serial Number 104,471, filed October seventh, 1936. Each key section comprises the usual number of value keys 100, which are slidably mounted in a channel key frame 101 and are normally maintained in raised position by suitable coil springs 102. The key stems 103 are assembled into the channel frame 101 (see Figure 3), by insertion from the top, the slot in the upper side of the channel member being of sufficient width to pass the projection 104 of the key stem, but the registering slot in the lower side being of lesser width, preventing the key stem from dropping through and also adapted to contact projection 104 to provide a limiting stop in operation of the mechanism.

After insertion of the key stems, a strip 105 is secured in place by means of screws 106, thus blocking a portion of the upper slot and preventing withdrawal of the key stems. Strip 105 also carries a strip 107 of rubber or other resilient material against which projections 104 abut when the key stems 103 are pressed upward by their springs. This serves to diminish the noise ordinarily incident to the release of keys from their latching means and their return to raised position. Each key section is mounted in the machine between members 108 and 109 which extend between the side plates of the machine.

Disposed underneath the value keys "one" to "nine" inclusive, is a differentially settable bar 120 which is pivotally suspended from the key section frame 101 by means of two parallel links 128 and 129. This bar 120 has nine identical notches 130, each of which has at its bottom a downwardly extending slot 131 adapted to receive the end of a key stem 103. The vertical center lines of the key stems 100 are spaced an equal distance apart. This distance, however, is slightly greater than the spacing between successive slots 131 so that each succeeding slot 131 will be spaced one increment further away from its cooperating key stem. This spacing is proportioned in such a way that depression of a value key will cam the bar 120 to the rear, a number of increments equal to the value represented by the depressed key.

Movement of each bar 120 is utilized to set up a mechanical representation of the selected value whereby the calculating mechanism may be accordingly controlled. A swinging segment member 132 is mounted upon a common shaft 137 which supports like members associated with other key banks. This member is provided at opposite ends with arcuate racks 138 and 139, which serve to transmit the movement of the differential bar 120 respectively to a check dial assembly 140 positioned on a shaft 141 in alignment with similar dials associated with the other key sections so that the value set up on the entire keyboard is read in a straight line of dials, and to a cam unit 146 having a series of cams each comprising high and low points which are angularly displaced relative to the corresponding points on an adjacent cam. The cam unit is thus positioned by such movement so as to form a mechanical representation of the number set up whereby the calculating mechanism may be controlled as set forth in the above identified Avery applications.

The aforementioned cam unit 146 is driven through a gear 151 forming a portion of the unit (Figure 2), the gear being in mesh with rack 139 on member 132. The member 132 and the selection bar 120 are connected by means of a pin and slot connection 163 so that the member is rotated directly about the shaft 137 upon depression of any key. Upon release of a depressed key, the return spring 164 (Figure 2) acts to return cam unit 146 associated therewith and the check dial to zero position.

POWER SET SELECTION MECHANISM

After the setting of the mechanism heretofore described has been completed and upon manipulation of one of the operating controls, the power operated portion of the selection mechanism is brought into operation prior to operation of the calculating mechanism, and acts, under control of the cam units 146, to move elements of the calculating mechanism to the proper position to condition it for effecting entry of the value set up on the keyboard into the accumulator.

This mechanism comprises three shafts 166, 167, and 168, hereinafter referred to as the half, quarter, and twelfth speed shafts, respectively (Figures 2 and 5), and common to all orders of the machine. The shafts are connected to the prime mover through gearing and a cyclic clutch as hereinafter described, so that shaft 166 rotates through 180° for each cycle of operation of the machine, shaft 167 rotates through 90° for each cycle of operation of the machine, while shaft 168 moves through 30° for each cycle of operation. A series of sleeves 169 (Figure 2), one for each decimal order, is freely mounted on a common pivot shaft 170 disposed between the shafts 166, 167, and 168, and each sleeve has keyed thereto several spaced gears for driving the several orders of the registering mechanism, as hereinafter described.

Means are provided for connecting each of the several sleeves 169 so that each sleeve can be selectively locked or driven by shaft 166, shaft 167, or shaft 168 at any of nine different rates with respect to the prime mover, said rates corresponding to the values delineated upon keys 100. Since this mechanism, which is duplicated in each decimal order of the machine, is fully described in the above identified Avery patents and application, Serial Number 84,927, only a brief description of its operation will be necessary to an understanding of the present invention.

Five selection plates 172, 178, 184, 190, and 196 (Figures 2 and 6) are pivotally suspended on sleeve 169 in each order, and each has mounted thereon a pair of entrained gears as at 173 and 174, the latter meshing with a gear keyed to the sleeve 169. The gears 173 and 174 have different gear ratios on the different plates. One of the five plates of each order is positioned during a selection operation to select a value or zero, the remaining four plates of the order being held in idle position. The value positions are positions in which the plate-carried gears mesh with gears on shafts 166 or 167, while the intermediate position is that in which no such connection is effected. Thus, if a "six" is to be selected, by way of example, plate 172 will be swung to the left in Figure 2, to engage its gear 173 with gear 175 on shaft 166, while all the other plates will be positioned in intermediate or idle positions.

This simultaneous setting of the selection plates is effected by power driven mechanism which senses the cam units 146 hereinbefore mentioned. This mechanism comprises a group of five identical feeler arms 210 (Figure 2), one for each of the five plates 172, 178, 184, 190, and 196, and pivotally connected thereto by studs 205. Each arm is provided with a sensing nose 211 adapted to be pressed against the associated cam with which it is in radial alignment. These feeler arms 210 are pivotally supported on a common shaft 213 supported by links 214 pivoted to the frame of the machine at 215, and each feeler arm 210 is connected by a link 216 with a second feeler arm 217 pivotally mounted on a shaft 218 supported in the frame, and provided with a sensing nose 219 adapted to contact the same cam at a point approximately 180° removed from the point at which it is contacted by nose 211. This sensing system is actuated by a plurality of pairs of complementary cams 220 and 221 adapted to be driven by means hereinafter described, and cooperating with cam followers 222 and 223 to rock a lever 224 pivoted to the frame at 225 and connected by a link 226 with shaft 213.

In operation, as cam lever 224 is rocked by these cams, each set of sensing noses 211 and 219 will be moved toward that cam in the cam unit 146 with which it is in radial alignment, and if nose 211 meets a low point 161 of one of the cams, the nose 219 will meet the opposite high point 160, thereby rocking the connected selection plate into its forward position. If, on the other hand, nose 211 meets a high point 160 of one of the cams, the nose 219 will meet the opposite low point 161 and the selection plate to which arm 210 is attached will be moved into its rearward position, as viewed in Figure 2.

If, in the third case, nose 211 meets only an intermediate portion and does not engage either a high or a low point of a cam, nose 219 will do likewise, and the connected plate will be positively positioned in central or neutral position in which its idler gear 173 will be out of mesh with the gears on both shafts 166 and 167.

To accurately position each cam in cam unit 146 before this sensing operation, a pawl 230 (Figure 2) is mounted on shaft 218 and is urged by spring 231 against pin 232 on link 214. When link 214 is released to engage gear 151, aligning the unit 146 of which the gear forms a part, and holding it against possible displacement during sensing.

The five cams, composing each selection cam unit 146, have their respective high and low points so positioned around their peripheries, and are so offset with respect to each other that if one of the feelers 211 in each order meets either a high or a low point on one of the five cams, the other four feelers 211 in the same order will not meet either a high or a low point on their associated cams. Thus, in each sensing operation, only one of the five selection plates will be rocked either forwardly or rearwardly, the other four of said plates in that order being maintained in their intermediate or neutral position. Thus, the gears carried by each sleeve 169 can be operatively meshed only by a single train with one of the gears carried on either shaft 166 or shaft 167, or else locked by pawl 201. By this means, any selection from "zero" to "nine" inclusive, is effected in each decimal order under the control of keys 100.

Means are provided for locking the selection plates in the relationship above described, comprising a lock bail 236 sometimes known as a gate (Figure 2) extending across all orders in the machine. The gate is pivoted to the frame of the machine at 237 and engages one of three notches 238 in each selection plate to hold said plate against movement in either direction. All the selection plates are engaged simultaneously, the gate being operated by the setting clutch mechanism hereinafter described.

ACCUMULATOR MECHANISM

From the foregoing description of the selection mechanism, it is apparent that a number comprising a plurality of figures can be registered upon the several sleeves 169 by differentially driving the gears attached to these sleeves various distances proportionate to the quantitative relation of the several figures composing the number. However, in order to perform any mathematical computation such as addition, subtraction, multiplication, or division, mechanism must be provided for advancing a superior registering element one extra increment whenever the next lower element has made a complete rotation. This process is known as "carrying the tens," in a machine operating according to the decimal system.

Figure 7:
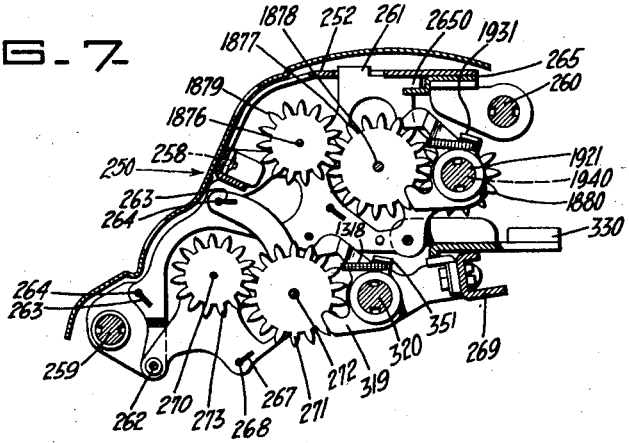
Figure 8:
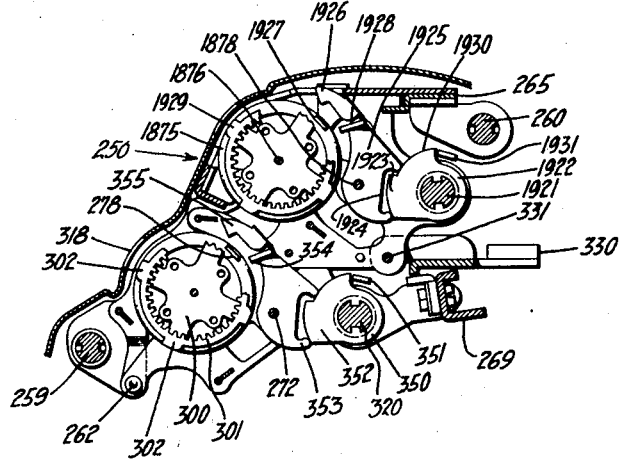

In the present machine this function is accomplished by accumulator mechanism mounted in a carriage 250 (Figure 1), the main frame of which comprises end plates connected by a top plate 252 (Figure 7) having apertures to receive lugs on the end plates and secured at its forward end by screws which extend into the end plates. The forward end of plate 252 is notched to fit into notches in brace plates 255 (Figure 9) and to provide extension 256 fitting between adjacent brace plates 255. Screws 258 secure ears on some of the brace plates to the top plate 252 (Figure 7). Front and rear carriage track shafts 259 and 260, the ends of which are journaled in the two end plates, and the several other cross shafts to be hereafter described, serve as additional bracing means for this main frame structure.

Mounted at even intervals between the two end plates are a series of carriage brace plates 255 (Figures 7, 8, 9, and 10) having lugs 261 projecting through spaced slots in the top plate 252 and supported at the front of the carriage by a cross shaft 262. Locked spacing combs 263 extend through spaced slots in each brace plate and are locked in place by rods 264, while the top plate 252 spaces adjacent plates 255, as has been described. A retaining comb 265 secured to the top plate 252 spaces the rear edges of the plates and, by underlying lugs 2650 formed on said plates, serves to hold lugs 261 in their notches in the top plate.

Supported in the end plates and by the several brace plates 255, is the cross rod 262 which serves as a pivotal support for a series of plates 266 (Figure 9), one of which is mounted on said rod 262 adjacent each of the carriage brace plates 255. These plates 266 are spaced and braced adjacent their forward ends by comb 267 interlocking with slots in each plate 266 and held in place by rod 268. The plates are connected at their rear end by a common bail 269 known as the "dipping bail," by means of which the entire body of plates 266 can be simultaneously oscillated about shaft 262 during operations hereinafter described (see Figure 27 also), in which description the mechanism supported by said plates 255 is referred to as the "dipping carriage."

The units of the accumulator are assembled on a shaft 270 supported by plates 255, there being one of such plates 266 between each adjacent unit, so that each unit forms a separate assembly between two of said plates. Each unit is adapted to be driven by one of the selection gears (Figures 2 and 27) with which intermediate gears 271, rotatably mounted on shaft 272 and entrained with the gears 273 of the several accumulator units, may be meshed by lowering the dipping carriage, as hereinafter described. Suitable clearances are provided on the several plates 255 to permit the necessary connections between the orders of the accumulator for effecting tens transfer or carry operation.

Referring more particularly to Figures 11 and 12, it will be noted that each accumulator unit comprises a spider 274 which is rigidly secured to a sleeve 275 on shaft 270. This spider 274 carries an internal ring gear 276 on its right hand side, which is spot welded or riveted to the flared out portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine" arranged as shown. Integral with the sleeve 275 surrounding said shaft 270 is a sun gear 280 abutting a brace plate 255, and interposed between said sun gear 280 and the spider 274, is a snail cam 281 and spacer 282.

The snail cam 281 (see also Figure 9) has an aperture through which projects a lateral extension 283 of spider 274, thus causing said cam and spider to rotate as a unit and the sleeve 275 is riveted over the spider, forming these parts into a functional unit.

Located immediately to the right of mechanism just described is a plate 292 fixed to the spur gear 273 which is driven by a gear 189 through an intermediate gear 271 when plates 266 are dipped. These elements are rotatably mounted on a sleeve 293 which in turn is rotatably mounted on a sleeve 294. Plate 292, which includes an apertured ear 295 for use in timing is, in turn, fixed to a member 296 by studs 297. Provided at each end of said member, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276 constitute a planetary assembly which rotates about the sun gear 299 and comprises the means by which the numeral bearing shell 279 can be rotated by the actuating mechanism of the machine which drives the gear 271 as hereinafter described. Secured to the right end of the above mentioned sun gear sleeve 294 is a spider 300 carrying an internal gear 301, the spider and gear being provided with four lugs 302 which serve as assembly guides and as stops, as hereinafter described. The spider also includes four apertured ears 303 for use in timing, as will appear.

For the purpose of carrying tens, means are provided for driving the spider 274 and its associated dial shell 279 by means of the spider 274 of the next lower order independently of any movement of the gear 273. This means includes the aforementioned internal gear 301 and another unit subassembly now to be described. Sleeve 294 which, as previously described, supports the sleeve 293 on shaft 270, is provided with a double arm member 304, one arm 305 of which is apertured, while to the other, 306, is secured a stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing another unit assembly. The central portion of member 304 is equipped with a gear segment 311 meshing with teeth 312 (Figure 10) formed on a lever 313 pivoted to a shaft 272 which is mounted parallel to the shaft 270 in the plates 266. Lever 313 includes an extension 314 engaging a lever 315 also mounted on shaft 272 (Figure 9) which lever carries a roller 316 in the same plane as snail cam 281. Lever 313 is urged clockwise by spring 318 so that the roller 316 carried by lever 315 is urged thereby into contact with the adjacent snail cam 281. In the units order the sleeve 293 may be secured directly to the plate 266 adjoining it at the right, inasmuch as there is no lower order from which tens must be carried.

This arrangement of the several accumulator units permits simultaneous digitation and tens transfer operations known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 279, this movement will bring a figure opposite the sight opening 318 in the carriage cover, indicative of the portion of a rotation given gear 273.

Whenever a given amount is thus entered in any one unit of the accumulator, one tenth of that amount will be entered in the next higher unit by means of the carrying mechanism comprising sun gear 280 fixed to spider 274 and driving planetary gears 308 and 309, these in turn, driving internal gear 301 fixed to sleeve 293 of the next higher unit in a direction opposite to that of spider 274, and, by rotating said sleeve, driving sun gear 299 integral therewith. If gear 273 is stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of that produced by the rotation of gear 299 and that produced by the rotation of gear 273, the movement of the ring gear, of course, being the resultant of the movement of the sun gear and the displacement of planetary centers. Thus the movement of any higher order dial becomes the resultant of the digitation entry into its own order and the carry movement from the next lower order.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319 (Figure 7), freely mounted on a shaft 320, each of which is adapted to engage the associated intermediate gear 271 in each order. As described above, these gears 271 mesh directly with the gears 189 of each accumulator unit (Figure 27) and each pawl 319 therefore acts as a retaining means for one of said gears, being released during actuation, as will presently appear.

Thus, from the foregoing description, it is apparent that rotation of a numeral wheel in any order will cause all the numeral wheels in the higher order or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced so that the numerals are not properly lined up at the sight openings 318, and, in order to overcome this condition and render a readable indication of the result, mechanisms have been provided which will turn every numeral wheel to proper alignment with said sight openings directly after an actuation.

The mechanism for attaining this lineup operation of said dials comprises the snail cam 281 which is secured to the left side of each spider 274, and which cooperates with and serves to position the indirectly spring tensioned lever 315 pivoted at 272 (Figure 9). In this figure the snail cam 281 and lever 315 are shown in a position in which the roller 316 on said lever contacts with the highest point of said snail cam, which high point represents the zero position of its associated dial wheel 279. The contour of said snail cams is proportioned in such a manner that each higher digit up to nine on the dials is represented by a successive decrease in size of its radius until the lowest point on said cams represent the digit "9" on said numeral wheels; the values increasing on the dials as well as on the cams in clockwise direction, so that for addition the dials and cams are rotated in counter-clockwise direction and for subtraction in clockwise direction, when viewing the machine from the right hand side.

As the carriage is moved down into this lowered position, a notch in extension 340 on lever 313 engages a shaft 339 which is extended through plates 255. This rocks lever 313 counter-clockwise and results in member 304 moving clockwise to advance gears 309 and 308. This results in the carry from the right, received by gear 309 from gear 280 with which it is meshed and which is in the next order to the left, being entered into the next higher order. When the dipping carriage is in its lowered position, lever 315 is freed by lug 314 and permitted to fall to a position in which roller 316 is just clear of snail cam 281. Under these conditions, sleeve 294 and studs 307 (Figure 11) are held in fixed positions, and each dial is in general advanced to a partial position depending on the digitation it has received and the carry from all orders to the right. For instance, if the resultant value entered is "2.375," the first dial stands between a "2" and a "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

When the calculating is completed and the dipping carriage raised, it is desired to back up each dial by the fractional amount it stands ahead of an even registration to secure a clear registration in the sight openings. To this end, each lever 315 (Figure 9) is allowed to rock clockwise under the tension of spring 1318 (Figure 10) until roller 316 rests against snail cam 281 which, with the cam shaped as already described, allows lever 315 to rock clockwise by an amount proportional to the registration on the dial to which the cam is attached. This rocking of each lever 315 rocks each associated sleeve 294 in a counter-clockwise direction, carrying stud 307 forward by an amount proportional to the registration on the dial to the right of it, thus rocking ring gear 301 by a corresponding amount and thereby backing up the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam standing under the roller prevents such backing out. The result is that when the dipping carriage is raised, each dial is controlled by the snail cam on the next lower order dial so that the proper figure will be squarely lined up to its sight opening.

The carriage is supported in the machine for transverse shifting in either direction by shafts 259 and 260 which slide through suitable bushings (not shown) positioned in side frames on opposite sides of the machine.

ACCUMULATOR CLEARING MECHANISM

It may be seen from the foregoing description that if ring gears 301 are locked against movement while segments 313 are rocked, then the teeth 312 will act to rock planetary gear carriers 304 and rotate planetary pinions 308 and 309 by feeding pinions 308 over the teeth locked ring gears 301. If the gears 271 are now free from the braking action of pawls 319, the rotation of planetary pinion 309 thus produced can, since gears 273 are free to rotate, drive sun gears 280 to rotate spiders 274 and their attached numeral wheels 279 backwards toward the position in which their zero digits align with the sight openings 318. If a stopping means be placed in the path of lug 278 carried by the numeral wheels 279 to prevent them from being driven beyond zero position, the braking pawl 319 may be restored to operative position and the lock withdrawn from ring gears 301, leaving the numeral wheels 279 aligned in zero position.

This mode of operation is used to set the accumulator to zero, and is under the control of the counter clear key 373 (Figure 1). Key 373, when depressed, sets into operation mechanism as disclosed in detail in the above identified Avery Patent Number 2,211,736, which causes the forward carriage supporting shaft 259 to rock (Figures 7, 8, 9, and 10). Shaft 259 is connected by suitable mechanism (not shown) to the shaft 320 which extends the length of the carriage to transmit its rocking movement to this latter shaft. Keyed upon the shaft 320 are rocking levers 350. Upon clockwise rocking movement of the shaft 320, levers 350 engage lateral projections 351 extending from associated pawls 319 and thus rock these pawls 319, which are free on shaft 320, in a clockwise direction against the action of springs 1318 to remove their pawling ends from engagement with the associated gears 271.

Each lever 350 also acts to rock its associated ring gear 301 and place the zero stops for the numeral wheel, and for this purpose is provided with an extension 352 engaging a notch formed in lever 353. Lever 353 is rockably mounted upon shaft 272 so that, upon clockwise rocking of lever 350, lever 353 is pushed in a counter-clockwise direction and lateral projection 354 on lever 353 is placed in a dial stop position. The lateral projections 354 are each of a sufficient width to engage the zero stop projection 278 (Figures 8 and 11) on each dial assembly as well as to engage one of the four projections 302 on the spider 300 and dial 301, and limit the latter against movement past zero position during clearing of the accumulator, thus providing the aforesaid stopping means. Rebound of the dials is prevented by the spring pressed latch 355, on each lever 353, which engages the other side of projection 278 in each assembly from that engaged by projection 354, and retains each dial shell against rebound.

The dials are each returned to zero position by mechanism comprising lateral projection 356 on each lever 313 (Figure 10), which are engaged by extensions formed on the lower end of the pawl 319 to rock lever 313 counter-clockwise on the shaft 272 against the pull of spring 1318. Teeth 312 on the lever 313 act to rock the planetary gear carrier 304 and rotate planetary pinions 308 and 309 by feeding the former over the teeth of the now locked ring gears 301. Since gears 271 are free to rotate, rotation of the planetary pinions 308 and 309 drives the gears 280 to rotate the spiders 274 connected thereto and their attached numeral wheels 279, backwardly to the position in which the zero digits align with the sight openings 318 in the carriage cover.

The shaft 320 is rocked in a counter-clockwise direction to move dial stop projections 354 and 355 (Figure 8) from cooperative relationship with lugs 278. This rocking movement also permits pawls 319 to reseat between the teeth of gears 271 and permit the segment 313 (Figure 10) to return under the tension of spring 1318 until the engagement of roller 316 with the periphery of its associated snail cam 281 prevents further movement of the segment 313 by engagement of lug 314 thereon with the roller carrying lever 315.

COUNTER MECHANISM

In the first form of counting mechanism disclosed in the accompanying drawings, two juxtaposed counter mechanisms are provided in the upper portion of the carriage 250 (Figures 1, 2, 7, 8, 9, and 10) to register the number of cycles of operation of the actuating mechanism in addition and subtraction and to register multipliers in multiplication operations and quotients in division operations. The counter mechanisms include two counter registers 1800 and 1801 (Figure 1) provided, respectively, on the left and right hand sides of the carriage.

Each register includes a plurality of dials 1875 which may be observed through openings 1874 (Figure 1) in the carriage cover and which are connected together by suitable tens-carrying mechanism. The construction of the dials 1875, as well as the tens-carrying mechanism therefor, is similar to that incorporated in the accumulator register to which reference may be had for a description of the details thereof.

The sign character of the registration in the left hand counter register 1800 is controlled by lever 1803 (Figures 1 and 18). When this lever is in its forward position, as shown in these views, counter register 1800 will give a direct or positive registration of multipliers in case of multiplication, and of quotients in the case of division; while, when lever 1803 is moved to its rearward position, the counter will give a complementary registration of multipliers in multiplication and a complementary registration of quotients in division.

While counting register 1800 is subject to the control of lever 1803, counting register 1801 cannot be controlled independently by the operator and the count in this register is always such that the counter dials are driven in a positive direction, giving a positive registration of quotients in division operations and a positive registration of multipliers in multiplication operations.

In order to obtain a positive registration in multiplication operations, it is necessary that the counter dials in both counter registers be driven in the same direction that the accumulator dials are driven, while, to obtain a positive registration of quotients in division operations, it is necessary that the counter dials in both counter registers be driven in the opposite direction to that in which the accumulator dials are driven. This requires a reversal of the drive of both counting registers upon the initiation of the division operation. Thus, in whichever position lever 1803 stands, the interchange from the proper direction of actuation of the counter for multiplication to the proper actuation for division, is automatically secured for register 1800 as well as for register 1801. In the present machine, this is accomplished without moving the lever 1803 from its manually set position. The construction of the counter actuator mechanism for register 1801 will now be described.

A main reverse unit 450 (Figure 15) is provided to selectively transmit rotation from a main clutch 428 to an idler unit 493 in opposite directions, as described in detail in the aforesaid Avery patents and application Serial Number 84,927. The reverse unit includes a pair of gear members 458 and 459 independently journaled on an integral clutch plate and a sleeve member 453 which, in turn, is journaled on a stationary shaft 429. The member 453 is keyed at 451 to a sleeve 419 which is suitably secured to the driven side of the main clutch 428. The gear members 458 and 459 are adapted to be selectively and alternatively secured to the clutch member 453 in the manner disclosed in detail in the copending Avery applications above referred to. Gear member 458 meshes directly with a gear 492 of an integral double idler unit 493, while the gear member 459 is entrained with the other gear 491 on the idler unit 493 through an idler 490 rotatably mounted upon a stud 490a extending from a stationary supporting plate 611, thereby enabling selective rotation of idler unit 493 in either of opposite directions.

As explained in the aforesaid Avery patents and application Serial Number 84,927, the setting of the main reverse unit 450 determines the direction of operation of the main actuating mechanism of the calculating machine. The counter actuating mechanism, since it is designed to count the net number of cycles of operation of this main actuating mechanism, is driven by the main reverse unit 450; but since it is desirable to render it possible to reverse the direction of operation of the counter actuating mechanism with respect to that of the main actuating mechanism, so that either net additive or net subtractive cycles of operation of the latter may be counted, a counter reversing unit is interposed between the main reversing unit 450 and the counter actuating mechanism.

This counter reversing unit comprises gears 1816 and 1818 (Figure 15) rotatably mounted on a shaft 1819 and driven in opposite directions by the idler unit 493, gear 491 of the latter meshing directly with gear 1816 while gear 492 drives gear 1818 through an idler 1820.

A flat slide 1812 is supported in a slotted end of shaft 1819 which is journaled in bearings 1526 and 1527 formed in the plates 611 and 524, respectively, and said slide includes a projection or key 1814 which can be selectively engaged with a slot 1815 provided in gear 1816 or a slot 1817 in gear 1818, so that shaft 1819 may be driven in either direction, selectively, while the idler unit 493 is driven in the same direction, thus selectively driving a gear 1821 keyed to shaft 1819 in either direction. Gear 1821 meshes with a gear 1822, fixed on a shaft 1823, which is thus selectively reversed in its direction of rotation to rotate said shaft 1823 in either a clockwise or a counter-clockwise direction. The ratio between the gears is such that, for each half revolution made by the main clutch, the gear 1822 will rotate one revolution and a finger 1824 (Figures 13, 15, and 17), driven by shaft 1823 as hereinafter disclosed, will describe a complete cycle. This arrangement results in the particular counter dial 1875 in register 1801 which is being operated by the counter actuator, being advanced one full increment, for each main clutch cycle, although this main clutch cycle is completed in only a half revolution of the clutch itself.

The counter actuating finger 1824 (Figures 13, 15, and 17) is pivotally connected at the rear thereof to the upper end of a lever 1830. Lever 1830 is freely mounted at the lower end thereof on an eccentric 1835 formed on the shaft 1823 and has an angularly formed slot 1832a formed intermediately thereof which is guided over a stationary fulcrum pin 1832 extending from a supporting member 612. The formation of slot 1832a is such that when the lower end of lever 1830 is moved through a circular path, diagrammatically indicated at A (Figure 17) by the eccentric 1835, the upper end thereof will describe a roughly triangular path diagrammatically indicated at B. The finger 1824 has a slot 1831a formed therein and guided over a second stationary fulcrum pin 1831 also extending from the member 612. Slot 1831a is so formed as to cause the actuating tooth of finger 1824 to describe a substantially triangular path, as diagrammatically indicated at C, on each rotation of shaft 1823. Thus, the tooth 1824 is moved first into engagement with a counter actuating gear 1880, then in a driving path to advance the gear 1880 one tooth, and finally in a retrograding outward movement at a speed which will enable it to intercept and arrest the next gear tooth in the event the gear is overthrown by the momentum of the various movable parts in the counter mechanism.

The above described mechanism for intermittently moving the actuating finger 1824 through such a driving path as to prevent overthrow of the driven gear is disclosed and claimed in the copending Avery application Serial Number 305,311, filed November twentieth, 1939.

The gear 1880 is selectively reversed by reversing the direction of rotation of the eccentric 1835. In one case, the finger is moved toward the gear, then up and back to drag the gear around. In the other, the finger is moved forward and down, to push the gear around in the opposite direction, and then out of engagement, and back. The finger is retracted from the gear 1880 after each single actuation so that the counter dial, having its train of gears 1879, 1877, and 1880 aligned with the finger 1824, is moved one step at a time.

A lever 1833 (Figure 13) is pivoted at its upper end to pin 1832 and is biased by a spring 1834 against a centralizing cam formation 1836 on the eccentric shaft 1823 to tend to centralize the eccentric, and thereby the finger 1824, in a position wherein the driving tooth 1837 on finger 1824 lies out of engagement with the gear 1880 at the apex of the triangular path of movement described thereby. Of course, this centralizing action occurs only when the main clutch 428 becomes disengaged.

The relation of the gearing is such that upon additive rotation of the twelfth, quarter, and half speed shafts, with projection 1814 in the slot in gear 1818, the counter actuating finger moves the counter dial 1875 aligned therewith in the same direction as the accumulator dials 279 while, with the projection 1814 in the slot in gear 1816, similar actuation results in the dials being moved in the subtractive direction and complementary figures being entered in the dials.

The setting of the counter reverse unit is under the control of a radial cam 1825 (Figures 13 and 15) on a lever 1808. This cam operates in a notch in a slidable shaft 1810 which is supported by a sleeve 1811 in plate 610. One end of shaft 1810 is keyed into the flat slide 1812 by enlarged portion 1813, whereby lateral movement of the shaft 1810 moves slide 1812 but slide 1812 may be rotated with respect to shaft 1810. This cam lever 1808 has an extending offset end 1825 which, when lever 1808 is rocked about a pivot bolt 1809 to engage the end 1825 with the notch in shaft 1810, shifts shaft 1810 to position the key 1814 of slide 1812 in the notch 1815 of gear 1816. When lever 1808 is rocked to engage the other end 1826 of the radial cam, the key 1814 is positioned in the notch 1817 of gear 1818. Lever 1808 is pivotally connected to one end of a link 1807, the other end of which is pivotally connected to an arm 1805 (Figure 13). In division, the arm 1805, freely mounted on a shaft 976, is rocked in a manner to be described hereinafter to set the counter reverse unit.

As has been previously mentioned, the counter register 1800 is under the control of lever 1803. This lever enables the operator to cause the direction of actuation of the counter dial in register 1800 to be reversed with respect to that of the counter dials in the counter register 1801. As appears in Figure 18, lever 1803 is mounted upon a stud 1840 on the left hand side frame of the machine and is connected by a link 1841 to the upper end of a lever 1842. Lever 1842 is pivoted to the side frame of the machine at 1842' and is connected by link 1843 to a reversing lever 1844 pivotally mounted upon a stud 1845 and having an extending end providing a two place radial cam 1847. This cam operates in a circular groove formed in the cylindrical end of a flat slide 1848 (Figure 15) which is supported in the associated slotted end of shaft 1819 driven through the counter reversing mechanism for register 1801, and upon which shaft gears 1852 and 1857, corresponding to gears 1816 and 1818, respectively, are freely mounted. The gear 1852 meshes with a gear 1853 forming part of an integral double idler 1854 which also includes a gear 1855 in mesh with an idler 1856. Idler 1856 meshes with gear 1857, supported on shaft 1819, which gear, in turn, meshes with a gear 1858 mounted on a shaft 1859. Rotation of the shaft 1859 is effective to move an actuating finger 1863 (Figure 18), similar to the finger 1824, by the same type of eccentric and centralizing mechanism as has been described in connection with Figures 13 and 17.

Under the control of lever 1803, lever 1844 is moved selectively to position slide 1848 so that projection or key 1860 thereon is engaged selectively with either the slot 1861 in gear 1852 or slot 1862 in gear 1857. In Figure 15, the projection is shown in engagement with the gear 1857 so that shaft 1819 is effective to rotate gear 1858 directly. If the lever 1844 is moved in the opposite direction, the slide 1848 is moved so that projection 1860 thereon engages the notch 1861 in gear 1852 and gear 1857 is driven in the opposite direction through gears 1852, 1853, 1855, and idler 1856 to reverse the path of movement of finger 1863 and thereby reverse the direction of operation of the dials in the register 1800.

Lever 1803 is centralized so that the slide 1848 is maintained in one or the other of its two selected positions. For this purpose the lower end of lever 1803 is provided with two adjacent angular faces 1865 and 1866 against which a lever 1867 is pulled by spring 1868. Rocking of the lever 1803 in either direction causes the lever 1867 to be moved in a clockwise direction to tension spring 1868 so that when the lever 1803 has been moved slightly more than half way between its two positions, the spring 1868 forces it over and completes the movement thereof, finally positioning the link 1843.

In the present case, the dials 1875 in both counter registers 1800 and 1801 are mounted upon a shaft 1867 (Figure 7) extending through brace plates 255. Each order of the counter unit includes a gear 1877 rotatably mounted upon a shaft 1878 and meshing with a gear 1879 operatively connected to an associated counter dial 1875. Gear 1879 corresponds to gear 273 in Figures 7 and 11. Gear 1877 is also in mesh with a gear 1880 which, in each actuated order in both counters 1800 and 1801, may be engaged by the corresponding actuating fingers 1863 and 1824.

Immediately prior to each operation of the counter dials 1875, either clockwise or counter-clockwise, roll carriers 1881 (Figure 9) are freed from spring tension to carry rollers 1882 thereon out of contact with and out of the path of snail cams 1883 similar to snail cams 281 of the accumulator hereinbefore described. This occurs, upon each dip of the dipping carriage, only in the order aligned with the actuating finger for operation thereby, and all orders to the left thereof in register 1801, but in all orders in register 1800 and obviates the strain on the mechanism which would result if the rollers had to be backed up the steep rise in the cams 1883 in additive operations.

The levers 1884 are rocked against the tension of their springs 1885 (Figure 10) upon each carriage dipping by a member 1890 carried by bell cranks 1891 on a shaft 594. The bell cranks 1891 lie beneath the dipping bail 269 so that each time the carriage dips, member 1890 rocks counter-clockwise to rock levers 1893 on a shaft 1894 and rock those levers 1884 which are opposite such of the levers 1893 as are engaged by member 1890 clockwise. Roller carrier levers 1881, being held against the snail cams only by springs 1885, which act through levers 1884, are thus freed from this tension and do not interfere with operation.

In the left hand register 1800, levers somewhat similar to levers 1893 are mounted on shaft 1894, but have their tails disposed beneath the dipping bail 269 so that each time the carriage is dipped, all the counter dials in register 1800 are free.

*Clearance of the counters*

Automatic means are provided for clearing the counter registers. This means is under control of a counter clear key 1910 provided adjacent the accumulator clear key 373 (Figure 1). Key 1910, when depressed, sets into operation mechanism as disclosed in the above identified Avery Patent Number 2,211,736, which causes the rear carriage supporting shaft 260 (Figures 7, 8, 9, 10, and 21) to rock. Shaft 260 is connected by suitable mechanism (not shown) to the shaft 1921 which extends the length of the counter register 1801 to transmit its rocking motion to the latter shaft.

Members 1922 (Figure 8) are keyed to shaft 1921 and each includes a projection 1923 lying in a niche 1924 of a juxtaposed rocking lever 1925 supported on shaft 1878. Rocking of each lever 1922 brings a yieldable projection 1926, similar to projection 355, into the path of the zero stop projection 1927 on the respective dial assembly, and also brings projection 1928 into the path of one of the four projections 1929 of the dial unit. Rocking of levers 1922 also results in ear 1930 thereon engaging a projection 1931 on a pawl 1932 (Figure 10) to lift the pawl free from an associated gear 1877. Further movement of lever 1922 by rocking of shaft 1921 brings projection 1933 (Figure 10) on pawl 1932 into engagement with ear 1934 of member 1884. This member, therefore, rocks planetary gear carrier 1876 in the same manner as does the carrier 304 described hereinbefore and returns the dial to zero position where projection 1928 engages projection 1927 on the dial. The dial is then in zero position where it remains.

The left hand counter register 1800 includes a shaft 1940 extending the length of this register and which is functionally similar to shaft 1921. Units similar to those connected to shaft 1921 are mounted on shaft 1940 so that rocking of this shaft is effective to clear this register.

By means of a manually settable lever 1941 (Figures 1, 21 and 21A) the counter 1800 may be selectively cleared or remain uncleared upon clearing of the right hand register 1801.

For this purpose lever 1941 is freely mounted upon the shaft 1940 and includes a radial two place cam 1940' which bears against a pin 1943 slidable in a coaxial hole formed in the end of shaft 260. A spring 1944 is provided in the hole to urge the pin 1943 against the cam 1940'. The end of shaft 260 is slotted as is the hub of a lever 1945 freely mounted on the shaft 260. A pin 1947 extends transversely through the pin 1943 and rides in the slot of shaft 260. When the pin 1943 is moved inward by the cam 1940' of lever 1941 the pin 1947 also engages the slot in the hub of lever 1945 thereby clutching the lever to the shaft 260 and permitting the rocking movement of shaft 260 to be imparted to the lever.

Lever 1945 has a roller 1946 mounted thereon which rides against a cam surface formed on a lever 1948 which is secured to the clearing shaft 1940. Thus, with the lever 1941 moved to the position designated at "1" in Figure 1 the cam 1940' will allow the pin 1943 to carry the transverse pin 1947 out of engagement with the notch on the lever 1945 and depression of the clear key 1910 will effect clearing of the right hand register 1801 only. However, if lever 1941 is moved to the "2" position in Figure 1, the transverse pin 1947 will clutch the lever 1945 to shaft 260 and thus effect rocking of the clear shaft 1940, upon depression of key 1910, to clear both counter registers.

Modification of counter control mechanism

Figures 19 and 20 illustrate a modified form of counter control mechanism which may be employed when it is desirable to incorporate only one counting mechanism in the machine and at the same time make it possible to obtain either true or complementary factors or results, such as multipliers or quotients, while providing an automatic control of the counting mechanism during division. Although, the same counter reverse unit and counter finger may be employed as in the structure illustrated in Figures 13, 15, 17, and 18, a somewhat modified construction is shown corresponding to that disclosed in Avery Patent Number 2,229,630 above identified.

Referring to Figures 19 and 20, a counting finger 1303, having an actuating tooth 1304 formed thereon and adapted to engage the driving gear of the counter mechanism gear train, is journaled at its rear end on an eccentric 1305 and is slidably and rockably supported intermediately on a fulcrum pin 1306. Thus, the counter driving gear is selectively rotated in opposite directions by reversing the direction of rotation of the eccentric 1305. In one case, the finger is moved toward the gear, then up to drag the gear counter-clockwise one tooth and then back. In the other, the finger is moved forward, then down to drag the gear clockwise one tooth and then back.

Selective driving of the finger 1303 in either direction is under the joint control of a manually settable lever 1307 and the division controlling mechanism. The lever 1307 is centralized in either of two positions by a spring 1309 and is limited in either position by one of two spaced stop pins 1309 and 1310. A link 1311 is connected between lever 1309 and one end of a link 1312. This link 1312 is connected at its other end to an arm 1313 rockable on a stationary stud 1314 and is also connected to one end of a link 1315 which is connected at its opposite end to an arm 1316 free on the shaft 976. Arm 1316 is normally pressed counter-clockwise by a spring 1317 interposed between the arm and a lever 1318 pinned to shaft 976 and abuts an ear 1319 formed on the forward end of lever 1318. Shaft 976 forms part of the division controlling mechanism as will be described hereinafter.

Pivoted to the link 1312 midway between its ends is a link 1320 having its other end connected to a lever 1321 pivoted on a bearing pin 1322. A radial cam is formed on the lever 1321 and comprises a central flat section 1323 and two flat end sections 1324 and 1324', both lying in the same plane which plane is offset from a plane passing through the central section 1323. The cam operates in a slot formed in a slidable shaft 1345 operable in the same manner as the shaft 1810 of Figure 15 to shift the key 1325' of a slide 1325, rotatably connected to shaft 1345 at 1326, into notches 1328 or 1329 formed in gears 1330 and 1331, respectively, thus selectively connecting one of these gears to the slide.

As in the mechanism illustrated in Figure 15, the gears 1330 and 1331 are driven in opposite directions through a gear train including a reverse unit 450'. This unit is similar to that shown in Figure 15 and comprises a pair of gear members 458' and 459' independently journaled on a sleeve 453' driven by a main clutch 428'. Operation of the division controlling mechanism initiated by the division key 970, causes one of the gears 458' and 459', normally connected to the sleeve member 453', to be disconnected therefrom and the other to be connected. The gear 458' is entrained with one gear of a double idler 1336 through an idler 1337 while the gear 459' meshes directly with a second gear of this idler 1336. Thus, the idler 1336 will be driven in either of opposite directions depending on which of the gears 458' and 459' is connected with the sleeve member 453' and, in turn, will drive the gears 1330 and 1331 in opposite directions, being meshed directly with the gear 1330 and entrained with the gear 1331 through a pair of idlers 1338 and 1339 both secured to a rotatable shaft 1340.

The reversibly driven slide 1325 is slidably connected to and drives a gear 1341 meshing with an idler gear 1342, which, in turn, meshes with a gear 1343 secured to a shaft 1344 on which the eccentric 1305 is also secured.

Second modification of counter control mechanism

Figure 22 illustrates still another modified form of counter controlling mechanism somewhat similar to that shown in Figure 19, and also particularly applicable in cases where only one counting mechanism is used and where it is desired to enable either true or complementary factors, such as multipliers or quotients to be registered while obviating the necessity of manually changing the direction of operation of the counter mechanism when changing from a division calculation to a different calculation or vice versa.

In this case a three point cam 1345, similar to cam 1323 (Figure 19), is employed to control a sliding shaft 1810' identical with that of 1810 (Figure 15). Shaft 1810' controls the direction of operation of a counter reverse unit and counter actuating mechanism identical with that of Figures 13, 15, and 17.

The cam 1345 is integral with a lever 1346 pivoted on a bearing pin 1347. Lever 1346 is connected by means of a link 1348 to a mid-point on a control link 1349. Link 1349 is connected at its lower end to an arm 1350 free on the shaft 976 and urged counter-clockwise by a tension spring 1349 into engagement with an ear 1351 formed on an arm 1352 pinned on shaft 976. Arm 1352 is, itself, urged into a counter-clockwise position by a tension spring 1353 and, upon initiation of division operation, is rocked to a clockwise position by the shaft 976 as hereinafter described.

The upper end of link 1349 is connected by a short link 1354 to a manually settable lever 1355 pivoted on a stationary pin 1356. The lever 1355 is centralized in either of two positions by a centralizing lever 1357 pivoted at 1358 and urged clockwise by a spring 1359. This lever 1357 has a nose formed thereon and engaging either face of a projection 1360 formed on the lever 1355 to retain it in either position in which it may be set.

Assuming the division controlling mechanism to be out of operation, in which case the arm 1350 is positioned as illustrated in Figure 22, movement of lever 1355 to its rear illustrated position will cause the link 1349 to move the link 1348 to the position indicated at A, moving the upper end portion of the radial cam 1345 into controlling position, whereby the counter drive which is similar to that illustrated in Figures 13 and 15, for driving the finger 1824, will be conditioned to drive the counter register dials in the same direction as the accumulator dials are driven. However, when the lever 1355 is moved to its forward position, the link 1349 will pivot about its connection to arm 1350 and will move the link 1348 to position B wherein the central portion of the radial cam 1345 will be moved to controlling position and the counter drive will be conditioned to drive the counter register dials in a direction opposite to the direction of rotation of the accumulator dials, thereby registering complementary factors. The automatic control of the cam 1345 will be described hereinafter.

GENERAL CALCULATIONS DRIVE

Power for the various operations of the machine is supplied, under the control of the various control keys of the machine, through a plurality of power transmission devices including the main clutch 428, the setting clutch 430, the restore clutch 700, and the shift unit. To drive these devices, a motor 640 (Figure 24) is mounted within the frame of the machine. A flexible coupling 642 connects the motor drive shaft 643 to an overload release device such as an adjustable slip clutch 644. Any well known form of slip clutch may be used.

A pinion 645, driven by the slip clutch, drives the cyclically operable main clutch 428 through a transmission system including gear 646 carrying gear 647 meshed with gear 362, which is engaged with idler 650, which in turn engages and drives a gear 415 on the main clutch. The main clutch 428, when engaged, results in selective directional driving of the half, quarter, and twelfth speed (Figure 2) shafts under the control of a reverse unit which determines initial power application to either gear 459 or to gear 458. Thus, as appears under the description of the reverse unit, gears 459 and 458 are selectively driven through the main reverse unit, to drive the half, quarter, and twelfth speed shafts in a selected direction.

The setting clutch gear 430' (Figure 24) is driven by gear 648 on the same shaft with the gear 362 in the main clutch train. Gear 362 also drives a gear 361 on shaft 595 upon which is positioned the restore clutch 700. The shaft 595 rotates whenever the motor operates.

SETTING CLUTCH

The present machine employs a setting clutch and mechanism driven thereby to effect various operations incident to the commencement of a calculation under the power of the motor.

Operation of the setting clutch 430 (Figure 25) is under the control of the machine operator, particularly through the instrumentality of various operation control keys. The control of the clutch 430 is such that, immediately upon depression of one of said keys, the clutch is engaged, clutch dog 394 being raised to release the clutch, start the motor, and permit shaft 431 to be driven. Normally, however, the clutch dog 394, which is freely supported on shaft 501, is held in engagement with the clutch by spring 502.

To permit operation of the setting clutch by the control mechanism hereinafter described, an operating bar 503 is provided which is adapted to be operated thereby. Bar 503 is supported on the right side of a frame plate by means of levers 504 and 505 pivoted to the plate at 506 and 507, respectively, and to the bar at 508 and 509, respectively, and is normally held in raised position by spring 510 tensioned between the lower end of lever 504 and shaft 822.

So that lowering of the bar 503 may lift the clutch dog 394, a bell crank 512 is pivoted to the lever 505 at 513, and is provided with a notched arm 514 which overlies a lateral extension 515 on clutch dog 394 when the bell crank is in the position in which it is normally held by a spring 516 tensioned between the other arm of the bell crank and bar 503.

As the setting clutch dog 394 is raised it engages and rocks a lever 396 (Figure 23) pinned to a shaft 386 to transmit a clockwise rocking motion to a second lever 385 (Figure 13) likewise pinned to the shaft 386 and which is normally held counterclockwise by a spring 392. Lever 385 is connected by a pin and slot connection 387 to a lever 388 of a switch unit similar to that shown in Figure 22. Thus, counter-clockwise movement of lever 388 by the lever 385 effects closing of the switch contacts and completes the motor circuit to start the motor 640.

To limit operation of the setting clutch 430 to a single cycle, since this is all that is required to operate the mechanisms actuated by clutch 430, means are provided for returning the clutch dog 394 to cause disengagement of the clutch after half a revolution of the clutch and shaft 431, even though the control key initiating operation of the clutch 430 is held in depressed position. This is accomplished by releasing the clutch dog 394 from hooked arm 514 so that the spring 502 may move the clutch dog to contact the clutch 430, and enter one of the notches therein.

The mechanism for effecting this operation includes a cam 517 (Figure 26) on the setting clutch shaft 431, which is engaged by a roller 518 on the rocking lever 519 pinned to shaft 501. A bell crank 520 (Figure 25) is also pinned to shaft 501 and is provided with a lateral projection 521 at its forward end which may engage the arm 514 and rock the bell crank 512 against the tension of spring 516, about pin 513, to release the lateral projection 515 of the clutch dog 394.

Immediately upon operation of clutch dog 394 by arm 514, engagement of clutch 430 ensues and shaft 431 is rotated. Cam 517 thereupon rotates and moves projection 521 to engage hooked arm 512 and release the clutch dog 394, which, under the tension of spring 502 is urged to stop the clutch 430 and the shaft 431 upon completion of half a revolution. Spring 522 tensioned between bell crank 520 and the frame, urges shaft 501 clockwise and keeps roller 518 against cam 517.

The setting clutch, under the control of the operation control keys of the machine, operates the previously described power set selection and locking system, and effects the dipping of the accumulator carriage. The main clutch, for driving the actuator, is also operated by the setting clutch, the two clutches being interlocked so that another setting clutch operation can not be initiated during operation of the main clutch.

For these purposes, the setting clutch controls the operation of shaft 431. Upon this shaft are mounted in succession from left to right, a series of cams including the first dipping mechanism cams, the first set of selection lock gate cams, the several selection setting cams, of which three sets are usually employed, another set of selection lock gate cams, the second dipping mechanism cams; and, the main reverse cams, the setting clutch proper, the restore clutch conditioning cam, and the main clutch starting cam at the end of the shaft.

Main Reverse Unit

For reversing the direction of drive of the elements driven by the main clutch, particularly the direction of rotation of the half, quarter, and twelfth speed shafts, as well as the drive to the counter actuator, a selectively settable drive reversing unit is provided, the construction of which is described in detail in the above identified Avery Patent, Number 2,211,736.

Subtraction operations are accomplished by reversing the direction of rotation of the half, quarter, and twelfth speed shafts. Means actuated by the setting clutch are therefore provided (Figure 29) which may condition the main drive for reverse operation automatically by operation of the setting clutch 430.

A pendular lever 545 is capable of being acted upon by various control means and operating means to cause actuation of the reverse unit and change its setting. The pendular lever 545 is hinged on stub shaft 546, and a reverse unit controlling bar 547 is hinged thereon and supported by a link 548 having a bifurcated end slidable about setting clutch dog shaft 501. The reverse unit control bar 547 has an upturned end 549 underlying the reverse control unit 469 which is hinged on shaft 386 so that whenever shaft 431 is rotated by the setting clutch, and cams 550 and 551 rock plate 552, ear 553 will engage and raise the reverse control bar 547 to bring the upper face of its upturned end 549 into contact with one or the other of cross-ties 554 and 555 (Figure 29) on the reverse control unit 469.

The reverse control unit 469 includes a portion 556 having a radial slot 557 therein through which shaft 558 extends, and a spring pressed pawl 559 is hinged on the plate to releasably retain the control unit with the pawl on one side or the other of shaft 558, after it has been set by movement of reverse bar 547. Spring 560, as shown in Figure 29, is normally effective to position lever 547 in its rearward position so that it will be raised by cams 550 and 551, upon rotation of the setting clutch 430 and shaft 431, to engage cross-tie 554. The reverse clutch is thereupon conditioned by control unit 469 to drive the calculating mechanism in the adding direction.

If the pendular lever 545 is moved to draw reverse bar 547 forward, by any of the controls such as the division controls, or any of the minus setting mechanisms, the upturned end 549 of lever 547 is placed beneath cross-tie 555 so that, when the cams 550 and 551 are rotated, the reverse control unit 469 conditions reverse unit to drive the calculating mechanism in the subtractive direction. The pawl 559 retains the control unit 469 in position between operations of the setting clutch.

Carriage Dipping

After selection has been made of the values to be entered into the machine, entry of the values into the accumulator is effected so that the values may appear on the dial faces 279 in alignment with sight openings 318.

As previously described, the accumulator includes (Figures 9 and 27) a series of plates 266 connected by a common bail 269 and supported for a dipping movement by shaft 262. After selection, plates 266 are rocked about shaft 262 to bring gear 271 in each order into contact with intermediate gear 189 (Figures 6 and 27) keyed to sleeve 169 together with gears 171, 177, and 183. This group of gears 171, 177, 183, and 189, being keyed to a common sleeve 169 in each order, are rotated as a body at a certain speed and for a certain distance according to the value selected, as has been described in detail in the above identified Avery Patent Number 2,211,736. Dipping of the carriage also results in the release of gears 271 from the braking action of pawls 319, each pawl being carried down into engagement with a shaft 565 (Figures 5 and 27), whereby the pawls are rocked clockwise to release gears 271.

Meshing of intermediate gear 271 with gear 189 in each order, results in the selected value being placed in the accumulator by rotation of gears 189. To secure dipping of the carriage at the correct cyclic time, means operated by the setting clutch are provided for dipping the carriage and thus permitting transfer of the value selected.

The means for dipping the carriage, from that position in which it appears in Figures 2, 7, 8, 9, 10, and 27, to bring gears 271 into mesh with gears 189 and then elevate the carriage at completion of the calculation, comprise two vertical sliding links 566 (Figure 27) slidable over pins 567 on opposite sides of the machine. Each link is provided with rollers 568 engaging bail 269, the links being biased upwardly by a spring 569. Links 566 are hinged to cam levers 570 and 571 by eccentric studs 572 so as to provide for adjustment of the mesh between gears 271 and 189. The cam levers carry rollers 573 in engagement with cams 574 on shaft 431 so that the links 566 are positively pulled down by the setting clutch rotation.

Means are provided for latching the carriage in raised position when the accumulator is not in operation and during shifting or clearing operations, and for latching the carriage in its lower position during engagement of gears 271 and 189. This means includes a latch lever 575 in the form of a bell crank pivoted at 576 and having a nose 577 formed at the upper end thereof to engage the lower edge of lateral extensions 578 on cam levers 570 and 571. The latch levers are urged to engage the extensions 578 by spring 579, and are normally effective to maintain the carriage in its raised position.

To disengage the latch levers 575 and permit lowering of the carriage upon beginning of a setting clutch operation, as well as to latch the carriage in its lower position, means are provided to move levers 575 and so rock their noses 577 out of engagement with the lower faces of extensions 578, and back into engagement with the upper faces thereof. A lever 580 is secured to shaft 581 (Figure 29) in position to be engaged by an extension 582 on rock lever 552, so that rocking of plate 552 by reverse cams 550 and 551 also rocks shaft 581, to which rocking arms 583 and 584 are attached (Figure 27). Arm 583 is connected to levers 575 by pivotal connections 585 so that when they are thus rocked, the links 566 are not held by noses 577, and cams 574 may then lower the carriage. As the carriage reaches its down position, cams 550 and 551, by rocking plate 552 and arm 580 permit springs 579 to pull the latch levers counter-clockwise to re-engage extensions 578.

Rocking of shaft 202 to release pawls 201 from the blocking of gears 189 is accomplished in time with the dipping of the carriage so that release of the gears 189 is properly coordinated with the lowering of the carriage and the meshing of gears 271 with gears 189. Keyed to the shaft 202 on each side of the machine are depending levers 586 slotted to receive pins 587. The rocking cam lever 570 at the right hand side of the machine, looking from the front, includes an integral extension 588 which carries one pin 587 while, at the left hand side of the machine the lever 571 has an extension 589 carrying a similar pin 587. As appears in Figure 27, the members 588 and 589 are of different shapes because of the necessity of getting in and around certain other operating parts which might otherwise interfere.

When the setting clutch rotates the cam 574 to rock the cam levers 570 and 571, the pawls 201 are thus released, except in those orders in which a zero has been set up, as has been previously explained.

Movement of latch lever 575 is effected under the control of the described mechanism, and means are provided for releasing the latch lever 575 at the end of main clutch operation. These include (Figure 28) lever 584 secured to shaft 581, as are levers 580 and 583, so that the three move in unison. Hung on shaft 590 is a lever 591, one end of which is provided with an extension 592 lying against lever 584 and having a portion in engagement with cam 593 keyed to a sleeve 594 rotatably mounted on shaft 595. This sleeve is driven by a separate clutch 700 operated only as an incident to the termination of operations, and known as the "restore clutch."

When the main clutch dog 395 (Figure 31) is moved to stop and release main clutch 428 and open the motor circuit, as will be described hereinafter, the restore clutch starts operation and cam 593 is rotated. This rocks lever 591 clockwise to move lever 584 and so rocks levers 575 to release the latched-down carriage through the rocking of the levers 575 by levers 583 and pivotal connections 585.

The sleeve 594 carries another cam 596 (Figure 27) which is employed to prevent the carriage from rising too rapidly. Lever 597 hinged on shaft 598, bears against this cam and against a lever 599 keyed to a shaft 600. Lever 601 is also keyed to this shaft and is joined by a pin and slot connection 602 to one of the links 566 so that the rate of rise of the carriage under the pull of springs 569 is no greater than that permitted by cam 596.

Main Clutch Opening

The main clutch is engaged and its operation initiated by the setting clutch. Thus, when any one of the operation control keys is depressed, and the setting clutch started in operation, as has been previously described, the main clutch is automatically engaged, upon operation of the setting clutch, and may be held engaged for one or more cycles of operation, depending on the operation called for by the key depressed.

The main clutch structure has been described in detail in the above identified Avery Patent Number 2,211,736. The main clutch 428 is fixed to a rotatable sleeve mounted on the fixed shaft 429 which is positioned between frame plates 524 and 610 of the machine (Figure 24). The clutch is controlled by clutch dog 395 (Figure 26) mounted on stub shaft 611 and urged into engagement with the main clutch by spring 612a, tensioned between the left end of the dog and the frame. As the dog 395 is rocked to engage the clutch a projecting finger 409 thereon rocks the circuit controlling lever 23 (Figure 23) clockwise to close the motor circuit in the manner described hereinbefore in connection with the setting clutch.

A rocking lever 519 is pinned to shaft 501 and carries a roller 518 in engagement with the cam 517 carried by the setting clutch shaft 431 (Figure 26). The rocking lever carries a member 612 hinged thereon and urged to rock clockwise with respect to the rocking lever by spring 613, movement between the lever and member being limited by a pin 614 on the lever lying within a notch on the member 612. The member 612 is provided with a nose 615 which may engage a notch 616 on clutch dog 395 with a hooking action to prevent disengagement of these two parts. The push of member 612 against the dog serves to raise said dog toward the end of the half rotation of setting clutch shaft 431, the dog being rocked clockwise, and engagement of the main clutch 428 follows. Further rotation of cam 517 permits return of the rocking lever to the position shown in Figure 14 and permits clutch dog 395 to contact with and stop the clutch when it is freed from the holding means, hereinafter described, which can selectively lock the dog out of clutch engaging position for a plurality of cycles. The hinging of member 612 to the rocking lever 519 permits the setting clutch to operate without opening the main clutch in certain phases of the division operation as hereinafter described.

Main Clutch Control

To insure proper engagement of the main clutch, temporary retaining means are provided for locking the clutch dog out of engagement with the clutch during the first portion of the first cycle of its operation. This means comprises bell crank 625 (Figure 26) pivotally mounted on shaft 626 and urged by spring 627 to engage lateral projection 620 on the main clutch dog 395. The bell crank 625 includes a notch 628 which engages lateral projection 620 and retains the clutch dog 395 in clutch opening position upon the very first movement of the clutch dog by the setting clutch. During the first rotation of the main clutch, cam follower 629 is rocked about shaft 611 by a cam 630 on the main clutch shaft 429, so that the pin 631 on the cam follower rocks the bell crank 625 and the shaft 626 and releases the main clutch dog.

An additional latch is provided, however, whereby the main clutch dog may be latched free of the clutch for any selected number of cycles, and comprises an arm 632 (Figure 26) and bell crank 633 pinned to shaft 626 and urged in a clockwise direction by spring 634 tensioned between bell crank 634 and the frame. When the machine is at rest and bar 503 is in raised position, arm 632 is held by projection 622 on bar 503. Downward movement of bar 503 is accompanied by movement thereof to the right and permits lever 632 to rock clockwise so that shaft 626 is rotated by the said spring 634. The bell crank 633 includes a notch, a roller 635 being provided adjacent one face of the notch which may engage lateral projection 620 on the main clutch dog and latch the main clutch dog to slide off it easily and quickly when the end of the clutch operation has been determined, and holds the main clutch dog slightly lower than does notch 628 so that after lever 625 is once released it can not re-engage the main clutch dog and the dog is thus left free to drop home as soon as bell crank 633 is released.

If the bell crank 633 has not moved into position to engage the lateral extension 620, then the clutch dog can move to engage the clutch and stop it after a single cycle of operation. Lever 633 is latched from engaging the main clutch dog except when multicyclic operations of the main clutch are called for. As will presently appear, particularly during division operations, a lever 2050 (Figure 33) is hung from a shaft 2004 and is biased in a clockwise direction by a spring so as to overlie the tail of a lever 2051, also keyed upon the shaft 626. Except when multicyclic operations of the main clutch occur as called for, a shelf 2053 on the lever 2050 overlies the tail of lever 2051 and prevents clockwise rocking of shaft 626 so that lever 633 is prevented from engaging the extension 620 of the main clutch dog. However, if the bell crank 633 is permitted to rock, it will engage the lateral extension 620 and will retain the clutch dog in clutch open position so that further rotation of the main clutch will occur as has been predetermined.

The main clutch is thus operatively closed and engaged to drive as long as the operation control is effective, after which spring 510 returns bar 503 and pulls lever 632 in a counter-clockwise direction. Shaft 626 is thus rocked and bell crank 633 rocked to release the extension 620 of the main clutch dog which contacts, stops, and disengages the clutch.

RESTORE CLUTCH

The restore clutch 700 (Figure 31) is employed to effect the release of the carriage latch members 575 and to control the rate of the return of the carriage from its dipped position, as well as certain functions hereinafter described in connection with division operations. This clutch is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The lowering of the carriage creates a spring bias tending to move the clutch release dog away from the restore clutch and permit engagement of the restore clutch, but as this dog is normally latched by a member 701, the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is finished, the clutch release dog is spring pressed into the full cycle notch of the clutch housing, bringing the restore clutch to rest upon the completion of one cycle of operation.

The clutch particularly employed is similar to that disclosed in the patent to Friden, number 1,643,710. This clutch, which is mounted upon and driven by shaft 595 (Figures 27 and 31) is directly controlled by an extending nose 702 on a clutch release dog in the form of a bell crank 405 which is freely supported on the shaft 600 (see also Figure 27). For controlling the clutch release dog, an M-shaped member 703 is provided which has one foot rotatably mounted on the shaft 600, and a lug 704 thereon, supporting a spring 705 compressed between itself and the left arm of a bell crank or dog 405 carrying the nose 702.

An arm 722 keyed to the shaft 600, and thus rocked by dipping movement of the carriage, is resiliently connected to the M-shaped member 703 by a link unit 723 shown in detail in Figure 30. As appears in this figure, the link structure includes a first link member 706 secured by a pin 709 to the arm 722, and another link 711 secured by pin 712 to the M-shaped member 703, the other ends of each link being slotted as at 713 to receive either the pin 709 or 712. Each link has a cut out portion into which two tenons 714 and 715 extend, the respective tenons being of different lengths so that a column support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 is withdrawn from contact with the main clutch and an extension 409 on said dog is withdrawn from beneath a latch member 701 pivoted on a frame plate, thus permitting said latch member to be rocked counter-clockwise by its spring 717 tensioned between one end thereof and the frame. A lateral extension 718 on said latch member is thereby brought beneath the face 719 of the M-shaped member 703 to prevent the lowering of the carriage, which ensues immediately, from rocking the restore clutch dog 405. The foot of M-member 703 is provided with a shelf 720 overlying one end of a bell crank 721 which is rotatably supported on shaft 611. The other end of bell crank 721 is provided with a roller 707 lying against the periphery of a cam 708 on the setting clutch shaft 431. On rotation of the setting clutch, the bell crank 721 is rocked and shelf 720 is raised by the end of the bell crank to rock the M-shaped member 703 slightly clockwise about the shaft 600. This raising of the member 703 not only insures that the lug 718 of the latch member 701 will engage under the face 719 properly when the main clutch is engaged, but provided for the situation, occurring in certain division operations, when operation of the setting clutch does not cause engagement of the main clutch. In this situation the latch member 701 is not permitted to rock and the cam 708 serves to delay operation of the restore clutch until near the end of the setting clutch cycle. The reason for this delay will appear in the description of the division mechanism hereinafter.

As the setting clutch continues to rotate, the dipping carriage is lowered and shaft 600 is rocked counter-clockwise by arms 601 (see also Figure 27) keyed thereto and connected with the carriage lowering links 566. Arm 722 (Figure 31) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 409 strikes the lateral projection 718a of the latch member 701, rocking it clockwise and removing its lug 718 from under the face 719 of member 703. Spring 716 is then permitted to expand, shortening the link unit 723 and rocking the member 703 counter-clockwise to correspondingly move the restore clutch dog 405 through its contact with lug 724 on said member 703, thus engaging the restore clutch. As the lower end 408 of the clutch dog lever 405 moves downward, it rocks the circuit controlling lever 396 (Figure 23) clockwise to close the motor circuit in the manner described hereinbefore in connection with the setting clutch.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 763 clockwise, and to compress spring 716 until the nose 702 of the restore clutch dog 405 can reenter the aperture of the housing to disconnect the clutch, whereupon the mechanisms are brought to rest in the position shown in Figure 31.

DIVISION

The machine, in connection with which the present invention is described, includes improved control devices for automatically performing problems in division, but the invention is also applicable to machines utilizing other types of division controls. In division operations the dividend is set up in the accumulator, the divisor is set up on the keyboard, and the automatic division key is depressed which also effects control of the counter register. The machine thereupon carries out automatically the operation of dividing the divisor into the dividend and registering the quotient in the counter registers 1800 and 1801, the carriage being automatically shifted after registration of each quotient digit successively. The operation consists of successive subtractions of the divisor from those digits of the dividend which are registered in orders of the carriage aligned with the actuating mechanism, and which may be called the "effective dividend." As the carriage is automatically shifted to the left, additional dividend digits are successively brought into alignment with the actuating mechanism until the carriage reaches its leftward limit.

In performing such an operation it is necessary to shift the carriage when the aforementioned subtractions have reduced the effective dividend to a value below that of the divisor. Other machines do this automatically by utilizing the overdraft registration of nines across the accumulator to initiate, first a corrective addition cycle, and then a carriage shifting operation. The machine disclosed herein, however, provides mechanism for mechanically comparing the dividend and divisor and utilizing the indication of their relative magnitude, thus secured, to select the proper ensuing operation. All overdrafts, which have heretofore been necessary only for control purposes, can theoretically be eliminated by the use of such a mechanism, but in practice it is not practicable to set the controls to such a fine adjustment and some overdrafts do occur. These are, however, properly corrected by the mechanism provided.

KEYBOARD CONTROLLED MECHANISM

It will be recalled, from the description of the accumulator mechanism of the present machine, that when the carriage is dipped to bring the accumulator in position for operation by the actuating mechanism, the numerals registered may be moved out of alignment with the sight openings since each accumulator element assumes a position indicating not only the value registered on itself, but is also moved ahead to indicate such partial increments of an additional unit as have been transmitted to it from lower orders by the entrained carry mechanism. It is therefore necessary to provide mechanism for forming a similar representation of the divisor value in the decimal orders selected for effecting control of the operation.

Levers 900 (Figure 40) carrying sensing shelves 901 are adapted to be proportionately positioned, under control of the manually set selection mechanism of a plurality of keyboard orders, so as to form such a mechanical representation of the true rather than the decimal value set up in that order and the order to the right thereof. It is unnecessary to transmit partial increments to each lever 900 from keyboard orders below the next adjacent order, and no provision for it is therefore disclosed.

Each sensing lever 900 is pivoted by pin 902 on a bell crank member 903 and is urged to rock counter-clockwise by a spring 904 tensioned between member 903 and a stud 900a on the sensing lever 900. The lever 900 includes a stop lug 905 which overlies and engages member 903 to limit the movement of the lever 900 and has a blocking tail 906 which may be positioned to permit a gate 907 to rock in a counter-clockwise direction and prevent further actuation or to block the gate from rocking and thus have the machine operation continue, as will presently appear.

Bell cranks 903 are pivotally supported, in each order, between adjacent brace plates 142, as appears in Figures 5, 39, and 41, and include a bridge 913. Upon an extension 914 of each bridge is fixed a small sleeve 915 having a pin 916 slidably positioned therein and enclosing a spring 917a adapted to push the pin to the left, engaging head 916a on the pin with the end of the sleeve to limit the travel of the pin. The pin of each order extends through a hole in each brace plate into the bell crank member 903 of the next higher order to support both the bell crank member 903 of the next higher order and the bell crank member upon which the pin itself is carried.

Bell crank member 903 and lever 900 may be rocked as a unit about the pivot provided by pins 916 by lever 917 freely mounted on shaft 131 and carrying a pin 918 projecting into an open slot 919 in the member 903. Pivotally mounted on lever 917 (Figure 39) is a second lever 921 having an offset portion 922 adapted to bear against the end of an extension 923 on adjacent higher order selection segment 132. Another offset portion 924 on the opposite arm of lever 922 is adapted to bear against an extension 925 of an adjacent lower order selection segment 132. The two arms of lever 922 are so proportioned, and their bearing points on the two segments are so located, that movement of the lower order segment will transmit only one-tenth as much movement to the supporting lever 917 as will corresponding movement of the upper order segment. By this arrangement, lever 900 with its sensing shelf 901 may be raised about pivot pins 916 a number of increments corresponding to the setting of the adjacent higher order selection segment 132, plus an additional fraction of an increment decimally proportionate to the setting of the adjacent lower order selection segment.

To avoid undue loading of the key section, since the keys move the selection segments 132 directly, it is not desirable to move the levers 922 by the depression of keys, and since it is also necessary to keep the sensing shelves 901 out of range of possible interference with carriage elements except during certain portions of the division operation, mechanism is provided for normally maintaining all levers 922 raised beyond the furthest points reached by selection segment extensions 923 and 925 and for maintaining all levers 900 lowered sufficiently to avoid the possibility of contact with any carriage parts.

This is accomplished by mechanism including a plurality of levers 930 loosely keyed upon shaft 931 (Figures 40 and 42), and normally maintained in their extreme counter-clockwise positions with respect to shaft 931 by individual springs 931a. Each of these levers is provided with fingers 932 and 933 adapted to cooperate with lateral extensions 934 on levers 917. When the machine is not operating in division, and in division, until the setting clutch has started its cycle, the fingers 932 of members 930 are retained in engagement with these extensions and hold levers 917 rocked about shaft 137 in the position shown in Figure 43. This carries levers 922 sufficiently clear of selection segment extensions 923 and 925, and lifts bell crank members 903 so that the levers 900 thereon are pressed against the underside of cross rod 935 and rocked clockwise against the tension of springs 904 to lower the sensing shelves 901 sufficiently.

The sensing shelves 901 associated with lower orders than the highest order in which a divisor digit has been set up are blocked out of operation and are not permitted to rise beyond the position in which they are held by the blocking mechanism. Connected by a separate sleeve 936 (Figures 40 and 42) with each of the members 930, is a member 937 having a shelf 938 adapted to cooperate with a lug 939 on selection segment 132 of the adjacent higher order so that if the segment 132 of that order is advanced out of the zero position in which it is shown in Figure 40, the lug will overlie the shelf and prevent the member 937 from rocking with shaft 931, the loose keyway permitting its retention in this manner.

If one lever 930 is so blocked, all those to the right of it will be similarly blocked even though zeros are set therein, since lugs 940 on each lever 930 overlie each member 937 to the right, as is clearly shown in Figure 42, and all sleeves 936 to the right of a blocked sleeve are prevented from rocking in this manner.

From the foregoing it can be seen that when a divisor is set up on the keyboard and the shaft 931 is rocked counter-clockwise, the following positioning of parts described will be assumed:

1. The extension 923 of the selection segment on which the leftmost, or highest digit of the divisor is set up will cause the sensing shelf 901 of the next higher order to be positioned a fraction of an increment above its zero position depending upon the digit set up in that keyboard order alone;

2. The shelves 901 of all higher orders will assume a zero position;

3. The extension 923 of the previously mentioned selection segment, and the extension 924 of the next lower selection segment will jointly cause the sensing shelf 901 associated with the order in which the leftmost digit of the divisor is set up to be positioned so as to mechanically represent the actual value of the two digits in their proper decimal relation of ten to one;

4. The sensing shelves 901 of all lower orders will be blocked out of operation.

DIVISION CONTROL GATE

The positioning of the sensing shelves 901 (Figure 40) to the left of the highest digit of the divisor and in the highest significant order, when a divisor is set up on the keyboard and shaft 931 is rocked, effects control of the division operation. When the aforementioned shelves are positioned, that shelf in the highest significant order, and the next shelf to the left thereof, may control movement of a bail 907, sometimes known as a gate. This gate is mounted for a swinging movement about pins 942 (Figures 34 and 40) and extends across the machine with a finger 943 (see also Figure 42) extending rearwardly in each order between bell cranks 903 and cooperating with adjacent blocking tails 906. Before shaft 931 is rocked, the gate is held away from the blocking tails and out of a controlling position. For a short period after shaft 931 is rocked, the gate is held before being released. When the gate is released it is pulled counterclockwise by spring 944 until it engages one of the blocking tails 906 or, if it does not engage any tail, rocks through to that position shown in Figure 40 wherein it is effective to stop or prevent main clutch operation and actuation of the accumulator. However, so long as the gate is in engagement with a single blocking tail 906 and is prevented thereby from assuming that position shown in Figure 40, the main clutch will operate.

The fingers 943 which engage the blocking tails 906 are each slightly shorter than the finger in the next order to the left. A blocking tail in one order may therefore release the gate but the gate may only swing slightly before it engages the tail in the next lower order. The tail in that order may then block the gate from swinging through and so permits main clutch operation to continue.

The cooperation of the shelves 901, in the order to the left of the first value order, and in the first value order, with the accumulator mechanism, will be described presently.

The gate 907 controls operation of the main clutch. A lever 2117, pivoted coaxially with the gate, has a lug extending into the path of movement of the gate and is (Figure 34) connected by slot and pin connection to a lever 2118 which is secured on a shaft 2119. Rocking of shaft 2119 is effective to rock bell crank 2073 thereon (Figure 14), which has one arm adapted to contact with a lug 2075 on arm 633 fixed to shaft 626 and rock the shaft counter-clockwise to release the main clutch dog 395 from restraint of the multicycle latch 635, stopping the actuator. A second arm of the bell crank 2073 is adapted to contact with a lug 945 on the main clutch engaging interponent 612 and rock the interponent counter-clockwise to prevent its extension 615 from engaging the hook 616 of the main clutch dog 395. This prevents engagement of the main clutch by the setting clutch, unless the gate 907 is restrained by a blocking tail 906.

INITIATION OF DIVISION OPERATION

The operation of the machine to perform a division calculation is initiated by depression of division key 970. This key, when depressed, is latched down and causes actuation of the setting clutch dog 394, conditioning of the main reverse unit to ensure negative actuation of the main actuator, and conditioning of the counter reverse unit.

The division key 970 (Figure 33) is mounted upon a key stem 971 which is supported by parallel links 972 and 973 upon a frame plate in the control unit. A link 1027 is pivotally connected between the lower end of the link 973 and an arm 1026 pinned to the shaft 976 which is journaled in bearings formed in the side frame of the machine and which has loosely mounted thereon the arm 1805 (Figure 13) or the member 1318' (Figure 19) as described hereinbefore. When the division key 970 is depressed against the action of a tension spring 1804a connected between a pin on the side frame 610 and an arm 1804 pinned on shaft 976, an extension 980 (Figure 33) on link 973 is moved into a notch 981 formed on a latch 982. Latch 982 is mounted for rocking movement on a shaft 822 and is pulled in a clockwise direction by a spring 983 which is connected to a depending arm 984 formed on latch 982. Thus, as extension 980 moves into notch 981 it is latched to hold the division key 970 in a depressed position and the arm 1804, having been rocked by shaft 976 to engage and move the arm 1805 rearward, is also held. Rearward movement of arm 1805 causes the link 1807 to rock the lever 1808 to move the portion 1826 of the two place radial cam thereon (described under the heading "Counter mechanisms") into controlling position, thereby setting the counter reverse unit (Figures 13 and 15) to reverse the direction of rotation of the shaft 1823 with respect to the double idler gear unit 493. However, since the main reverse unit 450 is set to reverse the direction of rotation of the idler gear unit 493 upon initiation of division operation, as will be described later, the shafts 1819 and 1823 will still rotate in the same direction that they did before the division key 970 was depressed, namely, in an additive direction to cause a true or additive movement to be imparted to the counter register 1801.

Since the direction of rotation of shaft 1819 is not changed upon setting of the machine for division operation, it will be seen that the character of the count in counter register 1800, which is determined by the aforementioned manually settable lever 1803, will not be disturbed.

Referring to the modification shown in Figures 19 and 20, the various linkages connecting the lever 1307 and arm 1316 to the lever 1321 are such that the position of the manually settable lever 1307 determines whether true or complementary factors are to be registered regardless of whether the machine is operating in multiplication or division.

When the machine is not operating in division, the arm 1316 rests in its forward illustrated position and, when in this position movement of lever 1307 to its forward illustrated position will cause link 1320 to move to a position indicated at A, thus positioning the section 1324 of the radial cam on lever 1321 in controlling position and causing a direct or true factor to be registered in the counting register. However, when the lever 1307 is moved to its rearward position, the link 1320 will be moved to a position B, thus enabling the section 1323 of the radial cam to move into controlling position, thereby causing reversal of the direction of operation of the finger 1303 and a complementary or negative count to be made on the register.

Upon initiation of operation of the division controlling mechanism by depression of the division key 970, the shaft 976 is rocked as described hereinbefore to rock lever 1319 clockwise. Consequently arm 1316 is moved to its rearward position to reverse the setting of the counter reverse unit comprising slide 1325 and gears 1330 and 1331 (Figure 20). That is, upon depression of the division key 970 with the lever 1307 in its forward illustrated position, the link 1320 would be moved to a position indicated at 13 by arm 1316 and links 1312 and 1315, thereby reversing the setting of the counter reverse unit, while if lever 1307 were in its rearmost position, the link 1320, originally standing in position B, would be moved to a position indicated at C upon depression of the division key, thus also reversing the setting of the counter reverse unit. However, since the main reverse unit 450' (Figure 20) is also reversed during division, the direction of operation of finger 1303 will remain the same as when the machine is operating additively in addition or subtraction.

The modification shown in Figure 22 operates in a manner similar to that of Figures 19 and 20. Rocking of shaft 976 in a clockwise direction by depression of the division key causes arm 1352 to rock arm 1350 and move link 1349 from one position to another about its pivotal connection to link 1354. Thus, in the event the lever 1355 is in its rearward illustrated position wherein the link 1348 is normally maintained in position A to condition the counter register actuator to register true factors, rocking of the shaft 976 by the depression of the division key will cause the arm 1352 pinned on the shaft to move the arm 1350 and thus move link 1349 about its pivotal connection with link 1354 so as to move the link 1348 from position A to position B. This will cause the cam 1345 to move to a position in which it will reverse the setting of the counter reverse unit but since the main reverse unit is also reversed during division the counter register will still display true or direct factors.

In the event the lever 1355 is moved to its forward position, the link 1348 will be maintained in position B when the machine is not operating in division and the central portion of cam 1345 will be in controlling position to set the counter reverse unit to cause the counter actuator to move the counter register in a subtractive manner to register complementary factors. Upon depression of the division key with lever 1355 in this position, shaft 976 will rock to cause the links 1349 and 1348 to move to their rearmost positions indicated at C, thus reversing the setting of the counter reverse unit and, since the main reverse unit is also reversed when the machine is operating in division, the counter register will still register complementary factors.

The key stem 971 carries a roller 974 (Figure 43) which lies in front of division control member 975 (see also Figure 32) when a division calculation is not taking place. Members 975 is rotatably mounted upon shaft 976 and is urged clockwise by a strong spring 977. When the division key is depressed, the roller 974 passes beneath face 978 on the member 975 and spring 977 rocks the member 975 clockwise until upper roller 979 thereon contacts the main operating bar 503 (see also Figure 25) and depresses said bar to rock the setting clutch dog 394, as has been previously explained.

The main reverse unit, previously referred to, is also conditioned, upon depression of the division key, to insure negative operation of the main actuator. In Figure 32, a bell crank 986 is shown mounted for hinged movement about stud 987. When the division control member 975 is released and rocks clockwise, the roller 979 is brought into engagement with the lower arm of bell crank 986 to rock it in a counter-clockwise direction. Bell crank 986 includes an extension 988 which overlies extension 989 (Figure 29) on pendular lever 545, and this rocking of the bell crank 986 thus rocks the pendular lever in a clockwise direction to condition the reverse unit for negative operation if it is not already so set, as has been previously explained.

Rocking of the shaft 931 (Figure 42) and the levers 930 and 937 thereon, is effected under the control of the mechanism particularly shown in Figures 34 to 38, inclusive. As there appears, a member 990 is fixedly keyed to the shaft 931 (Figures 36 and 37) while another member 991 (Figures 37 and 38) is loose upon the shaft. A latch member 992 is pivotally mounted on the frame at 993 and is urged by spring 994 into engagement with an ear 995 on member 990 so as to prevent premature counter-clockwise movement of shaft 931 to which the member 990 is keyed. These members also include extensions 997 and 998 respectively, for cooperation with a T-shaped member 999, supported from a rocking lever 1000 (Figure 34) carried on a shaft 1001, and provided with a pin 1002 lying in a slot 1003 in cam operated lever 553. Upon rotation of main reverse cams 550 and 551 (see also Figure 29) on the setting clutch shaft, the T-member 999 is rocked down and then up. Depending upon the position of the T-member, it may engage selectively either the extension 997 on member 990 or 998 on member 991.

The T-member is positioned by the division control member 975, this member carrying a pin 1005 (see also Figure 34) which extends into a slot in the end of rocking lever 1006, the lever 1006 being pivoted on a stud 994 on the right side frame (Figure 32). The T-member 999 carries a projection 1007 which extends into a cam slot 1008 in the lever 1006. When the division member is rocked toward the left, the T-member overlies extension 997 while, when the division member is rocked toward the right, to start a division operation, the T-member overlies extension 998. With the T-member in the latter position, rotation of the reverse conditioning cams 550 and 551, is effective to bring the T-member into engagement with the extension 998 and cause counter-clockwise rotation of the member 991.

Such movement of member 991, which is freely mounted on the shaft 931, first presses a lug 1010 on said member against the latch member 992, rocking it away from the ear 995 and freeing shaft 931 for counter-clockwise movement. As the movement continues, face 1009 of member 991, presses against the opposite side of ear 995, rocking the member 990 and the shaft 931 counter-clockwise. Levers 917, 922, and 900 are thereupon released to take up those positions determined by the selected value as heretofore described, and levers 930 and 937 are permitted to assume various positions dictated by the setting of the keyboard.

Counter-clockwise rotation of shaft 931, releasing the sensing mechanism, is effective to lock the carriage against lateral shifting movement (Figure 37). Member 990 keyed on shaft 931 is provided with an extension 1012 against which spring 1013 pulls lever 1014. Lever 1014 is positioned adjacent the right hand frame plate and includes an extension 1015 which is notched to engage a carriage brace plate 266 and retain the carriage against shifting movement until the extension 1012 is re-rocked in a clockwise direction so that the extension 1015 assumes that position shown in full lines in Figure 37. When the sensing mechanism is released, therefore, the carriage can not be shifted until the sensing mechanism is returned to its inactive position.

The gate 907 is also released by rocking of shaft 931, a lever 1016 being fixedly keyed to the end of this shaft, as appears in Figure 35. When this shaft is rocked, roller 1017 on lever 1018 is moved away from gate 907, but, to ensure that the several sensing shelves and their associated parts will have sufficient time within which to arrive at the positions dictated by the keyboard setting, the gate 907 although released upon rocking of shaft 931, is temporarily held by other means until well toward the end of the setting clutch cycle and after the gears 271 and 189 have been brought into mesh by dipping of the carriage.

The several plates 214 (Figures 2 and 32) carry the shaft 213 which extends across the machine through all orders. Mounted upon a stud 1020 on the control plate frame, is a delay latch 1021 (Figures 32 and 34) which is urged in a clockwise direction by spring 1022. When plates 214 are rocked in a counter-clockwise direction, upon initial operation of the setting clutch, as has been explained in connection with selection, the end of the delay latch 1021 is released by movement of the shaft 213 and is thereupon pulled in a clockwise direction by spring 1022 to position its nose 1023 behind an offset portion 1024 of rocking lever 2118 which is fixed on shaft 2119. This prevents lever 2118 from rocking in a clockwise direction and prevents the gate 907 from rocking into operation, upon rocking of shaft 931.

At the end of the setting clutch cycle, after the carriage has been lowered by the carriage dipping mechanism (Figure 27) and gears 271 and 189 are meshed, plates 214 are rocked clockwise and the shaft 213 returns to engage the delay latch and force it counter-clockwise to release gate 907 which is then pulled counter-clockwise by spring 944 to engage one of its fingers 943 with the blocking tail 906 of the sensing lever 900 in that order of the keyboard which is in control.

Toward the end of the setting clutch cycle (assuming that the gate 907 has been restrained by a blocking tail 906), the cam 517 (Figure 26) will rock lever 519 moving the extension 615 of interponent 612 into engagement with hook 916 on the main clutch dog 395 and rocking the said clutch dog to cause transmission of power through the main clutch.

The multicycle latch 633 then engages the clutch dog 395, lever 2050 (Figure 33) having been rocked to permit it to do so, by an arm 1025 fixed to shaft 976 and rocked clockwise by depression of the division key (Figure 33) by arm 1026 also fixed to the shaft and link 1027 and lever 973 connecting said arm to the stem of the division key.

Operation of the actuator is thus initiated, and continues until the blocking tails 906 are moved to release the gate 907.

ACCUMULATOR CONTROLLED MECHANISM AND OPERATION

The blocking tails 906 may be moved to release the gate 907 at the proper time, by elements of the previously described accumulator.

It will be recalled from the description of the accumulator mechanism that when the carriage is dipped to bring gears 271 (Figure 2) therein into mesh with gears 189 in the actuator for actuation, the numerals registered on the dial shells 279 may be moved out of alignment with the sight openings 318 since each accumulator element assumes an intermediate position indicating not only the value registered on itself but is also advanced such a partial increment of an additional value as has been transmitted to it from lower orders by the entrained carry mechanism. The dial shell 279 therefore, in the first order of the value set up in the accumulator, includes not only its own order value, but the decimal value of all lower values set in the accumulator.

It will also be recalled that snail cam 281 (Figure 9) moves with the dial shell and that lever 315 carries a roller 316 which may be pressed against the periphery of the cam so that the position of each lever will be a representation of the value position of its associated dial shell. This structure is used to control the release of the gate 907 at the proper stages in division operations.

Each roller carrier lever 315 has pivoted thereon, for limited movement, a lever 1040 (Figure 40), the nose of which can engage the sensing shelf 901 in the aligned order of the keyboard if that shelf is standing in a zero position, or any position representing a value. Now, with the first five orders from the left in the accumulator reading "00024," the noses of the first two levers 1040 will stand practically at a zero cam position, the tail of the third will stand at a position corresponding to a 0.24 position on the cam 281, the fourth at a position corresponding to a 2.4 cam position, and the last at a 4.0 position.

If the first five orders, from the left, on the keyboard are set "00008" and the shaft 931 is rocked, the first three sensing shelves 901 will assume their lowermost effective position, which in practice should be about equivalent to a .5 registration. The fourth shelf 901 will be positioned at an .8 registration by the mechanism described earlier herein, and the fifth shelf will be positioned at an 8. registration. Any remaining levers at the right will remain out of blocking relation with the gate, as previously set forth.

As the shaft 931 is rocked, the noses of the levers 1040 in the first three orders in the carriage, will be pressed against the shelves 901 and rock levers 900 clockwise so that the tails 906 thereof will be ineffective to block the gate. However, in the fourth order, the tail of the compounding lever will stand at a 2.4 value. Since this is a greater value than the .8 represented by its cooperating and opposite shelf 901 it will not contact this shelf 901 and the blocking member in this order, termed the "tens" order, will restrain the gate and the gears 189 will drive gears 271 negatively to subtract "8" from "24."

During the first cycle of subtraction, in the foregoing example, the remainder in the accumulator will be reduced to "16," the dial in the fifth order being driven backward from "4" through "0" to "6." Since its original 4, registration was, in the first place, less than the 8. registered on the aligned keyboard order, the original rocking of the shaft 931 pressed the shelf 901 of this order against the nose of aligned lever 1040 so that the blocking tail 906 was moved out of the path of the gate 907 leaving said gate restrained by the blocking tail of the next higher order alone. As this dial passes from "0" to "9," in this first cycle, the conformation of cam 281 permits the spring 904 to raise the shelf 901 high enough to carry the blocking tail 906 into the path of the gate 907, but this is only a temporary condition, for as the dial progresses to its final 6. position, the cam 281 again raises the blocking tail out of the path of the gate. It should be noted, however, that the progressive shortening of the fingers 943 of the gate 907, previously referred to, permits blocking tails to the right of one which is holding the gate, to drop into holding position at any time prior to full release of the gate.

Although the position of the lever 315 in the fourth order of the accumulator is changed from a 2.4 registration to a 1.6 registration during this first cycle, its aligned sensing shelf is positioned at .8 and hence is not moved out of blocking relation with the gate. A second subtraction cycle therefore ensues.

During this second subtraction cycle, the position of the lever 315 in this fourth order of the carriage is changed from a 1.6 registration to a .8 registration equaling the .8 registration position of the aligned sensing shelf, but still failing to rock the lever 935 to remove the blocking tail thereof from the path of the gate 941.

The lever 315 in the fifth order of the carriage is moved, during this second subtraction cycle, from a 6. registration downward to a 0. registration, upward to a 9. registration, and back downward to an 8. registration. The upward movement permits its associated blocking tail 906 to move into the path of a finger 943 of the gate 907 and the subsequent downward movement is insufficient to remove it from that position, so that at the close of the cycle both the fourth and fifth blocking tails 906 lie in the path of the gate 907 and another subtraction cycle ensues.

During the very first part of the third subtraction cycle, the downward movement of the fifth lever 315 in the carriage will be sufficient to remove its associated blocking tail 906 from the path of gate 941 leaving the gate held by the fourth blocking tail alone.

The registration on the fourth sensing shelf and its cooperating carriage lever were equal at the end of the second cycle, so that further lowering of the carriage lever during the third cycle immediately begins to rock the lever 900. A small movement of this lever is sufficient to remove its blocking tail from the path of the gate 907 which, thus released from restraint, is pulled counter-clockwise by spring 944 rocking shaft 2119 (Figure 32) clockwise, and thereby rocking bell crank 2073 (Figure 26) to carry the multi-cyclic latch 635 away from the main clutch dog 395 and thus arrest operation of the actuator.

In order to insure proper movement of "tens order" blocking tails, a compounding tip for lever 315 is provided in lever 1040, pivotally mounted thereon. When cooperating with a sensing shelf in any registration from "two" to "nine," lever 1040 assumes a position above that shown in Figure 40. As the lever 315 moves from a "one" to a "zero" registration, however, the tail 1041 of lever 1040 is pressed against a cross rod 268 so that the lever 1040 is rocked counter-clockwise on the lever 315 and its tip describes an arc about three times as long as between other positions. When functioning as a "tens order" control lever, the throwoff is always between "one" and "zero" and the compounding lever is brought into play for such control.

Rocking of the main clutch dog 395 by its spring 612 initiates operation of the restore clutch 700 in the manner previously described. Certain additional functions are performed under control of this clutch in division operations.

During the restore clutch cycle the dipping carriage is raised, and a link 846 (Figure 14) is moved to the left by cam 849 rotated by the restore clutch 700, thus rocking a lever 847 counter-clockwise about the shaft 976. This operation rocks the division control member 975 counter-clockwise from its rearward position to its forward position illustrated in Figure 14 by an arrangement comprising a bell crank 1042 pivotally mounted on lever 847 and having a notched end adapted to engage a lateral extension 1043 on the member 975. A second bell crank 1044 is freely mounted on shaft 976 and has one arm provided with a slot embracing a pin 1046 on the bell crank 1042. A spring 1045 tensioned between the other arm of bell crank 1044 and the frame, holds the bell crank 1042 in position to engage the extension 1043 during the first part of the movement of cam 849, but causes the bell crank 1042 to be rocked so as to override and miss the extension 1043 when the member 975 is in the position shown in Figure 14 when the cam operates. This movement of the member 975 carries its pin 1005 (Figures 32 and 34) to the right, rocking lever 1006 and, through lug 1007, the member 999, so that the T-shaped head of the latter overlies the lug 997 of member 990 (see also Figure 37) keyed to shaft 931.

The division member 975 is retained in its leftward position by latch lever 1050 (Figure 32) which is urged by spring 1051 to engage extension 1052 on the division member. The division control member remains latched in this position during the remainder of the division operation in that order.

Return of the division member 975 is effective to set the reverse unit for positive actuation, and open the setting clutch for another cycle of operation. Division member 975 carries a link 1054 which is provided with a notch 1055 which, upon the first forward movement of the division member, is pulled into engagement with extension 1056 on a bell crank 1057 (Figure 32) by a spring 1058a. Upon return of the division member, the bell crank 1057 is rocked in a clockwise direction so that the extension 1058 thereon presses down upon the main operating bar, as appears in Figure 25, to start a second setting clutch cycle. The bell crank 1057 also carries a roller 1059 which, upon clockwise rotation of the bell crank engages the pendular lever 545 (Figure 29) and rocks the link 547 to set the reverse unit for positive operation of the actuator by the main clutch. Movement of the link 846 by the cam 849 also rocks the gate 907 so that it may be relatched by the blocking tails if an overdraft has rendered the value registered by the accumulator greater than that set up on the keyboard. For this purpose link 846 is provided with an extension 1060 (Figure 14) adapted to rock an arm 1061 pinned to shaft 2119 and thus to rock the gate 907 (Figure 34) through levers 2117 and 2118. If the gate is not latched by the blocking tails, however, it will rock back as soon as the cam 849 permits it to do so, at the end of the restore clutch cycle.

As the restore clutch cycle terminates, the gate 907 is released unless it is held by the blocking tails, and is free to rock forward under the pull of springs 944. If the gate can pass through, as in the foregoing problem where there was no overdraft, bell crank 2073 is rocked and interponent 612 is moved by the initial rise of cam 517 (Figure 26) so that it will pass beneath and miss the main clutch dog and main clutch actuation will not occur. If the gate is blocked, however, a main clutch actuation follows. The main clutch actuation, controlled by opening of the main clutch dog, depends upon whether or not an overdraft has occurred, for if an overdraft has taken place, it is necessary that a positive operation follow.

The initial small rise of the main clutch opening cam 517 (Figure 26), either hooks the extension 615 of the interponent 612 into the hook 616 of the main clutch dog 395 or else carries the extension under the hook so that operation of the dog can not take place. As the setting clutch cycle proceeds, the main reverse cam lever 552 (Figure 29) not only sets the reverse unit for positive rotation, but also rocks lever 1000 (Figure 34) lowering member 999 which engages lug 997 and rocks shaft 931 to restore the sensing shelves 901 to the position in which they are shown in Figure 42 in which position they are lowered out of contact with the carriage elements. The shaft 931 is held in this position by the latch 992. Rocking of the member 999 also brings its arm 1012 (Figure 37) against lever 1014 raising its extension 1015 out of locking relation with the carriage so as to permit a shifting operation.

In any event it is necessary that the corrective positive actuation, if initiated, be limited to a single cycle of operation. During the setting clutch cycle, shaft 501 (Figure 26) is rocked by cam 517 rocking bell crank 520 (Figure 32) pinned to the shaft 501. By means of a lateral extension 521 on one arm of the bell crank 520, a lever 1062 freely mounted on the shaft 976 and having an end underlying the extension 521 is rocked to bring an extension 1063 on the other arm of lever 1062 against the link 1054 lifting its notched end 1055 and releasing the bell crank 1057 which is thereupon rocked counter-clockwise by its spring 1064. This raises the lug 1058 of the bell crank 1057 away from the main operating bar 503 (Figure 25) permitting the spring 518 to raise the bar and carry its lug 622 against the arm 632 (Figure 26) pinned to the shaft 626 so as to rock the shaft and remove the multicycle latch 635 from restraining relation with the main clutch dog 395. The main clutch dog therefore arrests operation of the main clutch after a single cycle of operation, and a second restore clutch operation proceeds in the usual manner.

If such a corrective cycle is not initiated, the restore clutch will be automatically engaged toward the end of the setting clutch cycle. Since, in such an operation, the main clutch dog 395 is not removed from the position in which it is shown in Figure 37, its extension 409 prevents any engagement of the latch member 701 under the M-shaped member 703 controlling the restore clutch, and as the carriage is dipped, engagement of the restore clutch is prevented only by engagement of the cam-rocked bell crank 721 with the extension 720 of the M-shaped member. As the setting clutch cycle draws to a close, the cam 708 permits its bell crank 721 to recede from under the extension 720 and, since the latch 701 is already held released by the extension 409 of the main clutch dog 395, the tensioned link unit 723 will cause the restore clutch to be engaged immediately.

Operation of the restore clutch causes the dipping carriage to be raised and initiates an automatic carriage shifting operation through mechanism described in detail hereinafter.

*Operation of Carriage Shift Mechanism in Division*

Means are included in the machine in connection with which the present invention is disclosed, for shifting the carriage 250, either to the right or to the left. The controls for this shift include an automatic one step shift of the carriage to the left after division operation in each carriage position until the last carriage position is entered. The construction and operation of this carriage shifting mechanism has been described in detail in the above identified Avery Patent Number 2,211,736 and application Serial Number 84,927, and a brief description of the controls therefor will be sufficient for an understanding of the present invention.

Movement of the carriage by the power driven mechanism is immediately under the control of a member 1300 (Figure 43) supported on a shaft 1301. This member is connected by a link 1374 to a lever 1375 which is rocked counter-clockwise or clockwise about shaft 1376, to move member 1300 likewise. When member 1300 is moved clockwise, extension 1302 thereon is positioned in engagement with toothed wheel 1303 whereby the carriage is shifted to the right. When member 1300 is moved counter-clockwise, member 1300 positions point 1304 in engagement with star wheel 1303 whereby the carriage is shifted to the left.

In automatic division operations, except when the carriage is in the left end position, link 1374 is moved to the left (Figure 43) to engage point 1304 with the star wheel 1305 to secure an automatic shift of the carriage one step to the left after the operation has been completed. During the second cycle of operation of the restore clutch in each carriage position, counter-clockwise movement of lever 570 (Figure 27) carries its lug 1386 against the end of link 1377 (see also Figure 43) moving link 1374, to which it is connected by member 1380, dog 1383 and lug 1384 to the left to initiate operation of the carriage shifting mechanism.

The first cycle of operation of the restore clutch in each carriage position does not initiate operation of the carriage shifting mechanism because, at that time the division control member 975 stands rocked clockwise from the position in which it is shown in Figure 43, and the roller 1065 on said member has lifted the left end of link 1374 depressing its right end below the path of movement of lug 1386. Later in the first restore clutch cycle, however, the member 975 is rocked counter-clockwise and latched in the position in which it is shown in Figure 43, as previously described, removing the roller 1065 from under link 1374 and permitting spring 1372 to rock the link until it abuts the under side of lug 1386. Subsequent dipping of the carriage by the setting clutch, preparatory to a possible correction cycle, then moves lug 1386 to the right permitting link 1374 to be rocked still further and to thus be brought into the path of the leftward movement of lug 1386 during the following cycle of operation of the restore clutch. The carriage is thus moved one step to the left bringing another digit into the "effective dividend."

Operation of the shifting mechanism, thus initiated, is automatically limited to a single cycle, and the division mechanism is automatically restarted at the end of that cycle. About the middle of the carriage shifting cycle, the floating cam 1334 (Figure 43) rocks lever 1356 operated by the carriage shifting mechanism. Bell crank 1387, pivoted on shaft 1338, has one arm adapted for engagement by a lateral extension 1066 on lever 1356 and has its other arm provided with an extension 1389 underlying both the shift control link 1374 and an extension of the division control member latch 1050. Clockwise rocking of the bell crank 1387 therefore causes a shelf 1389 thereon to rock the link 1374 to depress its right end and carry it clear of lug 1386, thus permitting a centralizer 1410 to disengage the shift power transmission at the end of the cycle, and also lifts the latch 1050 (see also Figure 32) freeing the division control member 975 which is thereupon rocked clockwise by its spring 977, restarting subtractive operation in the new carriage position as soon as centralizer 1410 has settled into the position in which it is shown in Figure 43 so as to carry the interlock lever 1416, attached to the centralizer by link 1418, out from under lug 1420 on the main operating bar link 505 (see also Figure 25).

TERMINATION OF DIVISION OPERATION

This repetitive tour of operations is repeated in each successive carriage position until the carriage reaches its leftmost position, when further operation of the carriage shifting mechanism is prevented and the machine is brought to rest. As the carriage moves into its leftmost position, a projectiton 1570 (Figure 33) on the right end of the carriage 250 contacts the under side of the cam end 1571 of lever 1572, rocking the lever counter-clockwise against the tension of spring 1573. Another arm of lever 1572 carries a pin 1575 lying in a slot 1576 in dog 1383 (Figure 43), so that this rocking of lever 1572 serves to lift dog 1383 clear of the lug 1384 on link 1374 and breaking the connection whereby movement of dog 1386 is ordinarily transmitted to link 1374 to start the shift.

During division operations, with the carriage in its leftmost position, the division key is unlatched and permitted to rise. A third arm of lever 1572 (Figure 33) underlies a lateral extension 1067 on the upper end of a bell crank 1068 pivoted at 1069 to the division key latch 982.

When the lever 1572 is rocked by the carriage, bell crank 1068 may be rocked by a spring 1070 to hook its other arm around lateral extension 1056 (Figures 32 and 33) of the bell crank 1057. This bell crank, it will be recalled, is rocked by link 1054 during the first restore clutch cycle in each order for the purpose of initiating a setting clutch cycle. If the end of bell crank 1068 (Figure 33) be hooked over its extension 1056 during such rocking of the bell crank 1057, bell crank 1068 will be pulled to the left, rocking the latch member 982 counter-clockwise about its supporting shaft and releasing the lateral extension 980 of lever 973 permitting the division key 970 to be raised by its spring since member 975 (Figure 32) is concurrently removed from its position overlying roller 974 on the division key stem. As the division key rises by the action of spring 1804A, which rocks lever 1804 pinned to shaft 976 counter-clockwise, and thus moves arm 1026 and link 1027 to rock the arm 973 counter-clockwise, roller 974 moves into blocking relationship with the rear face 978 of lever 975 preventing restarting of the actuating mechanism, and then releases latch 1050 by engaging and raising the lug 1098 on latch 1050. Release of the latch 1050 by this means is desirable because it is preferred to disable the shift initiating mechanism as above described.

Due to the counter-clockwise rocking of shaft 976 on rising of the division key 970, the arm 1804 (Figure 13) is also rocked, thus tensioning a spring 1806 extending between arm 1804 and the arm 1805, freely mounted on shaft 976, and tending to move the link 1807 forward. However, a projection 1827 on the lever 385 which had previously been rocked by the mechanism illustrated in Figure 23 into a notch formed between two projections 1828 and 1829 on link 1807, will prevent return of the link 1807 to its forward position until the setting clutch dog 394, the main clutch dog 395, and the restore clutch dog 405 have all been moved to clutch disengaging positions, at which time the lever 396 will be permitted to rock under the tension of the spring 392 (Figure 13) and thus rock lever 385 to remove the projection 1827 from its retaining position. Thereafter, the spring 1806 will move the link 1807 forward to reverse the setting of the counter reverse unit, which it will be seen, will occur only at the completion of a division operation.

In the modification illustrated in Figures 19 and 20, a circuit controlling lever, as at 385 (Figure 13), is not utilized to retain the counter reverse control link 1320 in its rearward position until completion of the division operation. This retaining means is necessary only in connection with division controls of the type specifically described herein, wherein the division key used to set the counter controls rises before the division operation is concluded. If the key used to set these controls does not return until substantially the conclusion of the operation, as in the case of the division controls disclosed in the aforesaid Avery Patent Number 2,229,630, no such retaining means is required. In this case, counter-clockwise rocking of the shaft 976, due to rising of the division key during the last cycle of actuator operation rocks lever 1319 and compresses the spring 1317, thus pulling on the lever 1320 which will be retained until the end of the main clutch cycle by the key 1325' on slide 1325 which will ride against the inner edge of gear 1330 or 1331 depending whether it is situated in slot 1328 or slot 1329. At the end of the main clutch cycle the slots 1328 and 1329 will become aligned allowing the key 1325' to slide from one to the other, thereby enabling the spring 1317 to draw the link 1320 forward to reverse the setting of the counter reverse unit.

The modification illustrated in Figure 22 utilizes a retaining means similar to that employed in connection with Figure 13 to retain the counter reverse unit against reversal after the division key has risen and before completion of the division calculation. In this case, the projection 1827 on lever 385 engages the forward face of either of two projections 1828' and 1829' on link 1348 depending upon the setting of lever 1355. If the lever 1355 is placed in its rearward illustrated position before starting division operation, initiation of a division operation will effect movement of the link 1348 to position B by the levers 1352 and 1350 as was described hereinbefore. Thus, rocking of the setting clutch dog 394 (Figure 23) will effect rocking of the lever 395 (Figure 22) to position the projection 1827 in front of projection 1828', in which position it will remain until the end of the division operation. Thereupon, removal of projection 1827 will enable the spring 1349, which was tensioned as the lever 1352 rocked forward due to rising of the division key, to return the link to its original set position A.

If the lever 1355 is placed in its forward position to effect a complementary count, initiation of a division operation will effect movement of the link 1348 from position B to position C. Thereafter the lever 385 will be rocked to position the projection 1827 in front of the projection 1829', of link 1348 and thereby hold the link in position C until the end of the division operation. Removal of projection 1827 will then allow the spring 1349 to draw the link 1348 back to position B.

The following copending Avery applications claim certain subject matter disclosed but not claimed in the present application: Serial Number 305,311, filed November twentieth, 1939; Serial Number 315,055, filed January twenty-second, 1940; and Serial Number 376,172, filed January twenty-seventh, 1941.

I claim:

1. In a calculating machine having an accumulator, a counter, separate actuating mechanisms for said accumulator and said counter, respectively, and a cyclic driving transmission common to said actuating mechanisms; the combination with settable means for reversing the direction of operation of said counter with respect to the direction of operation of said accumulator, of a setting device for said means movable to any of a series of positions, and effective upon movement thereof from any of its effective positions to an adjacent effective position for setting said settable means to effect a reversal of the direction of operation of said counter with respect to the direction of operation of said accumulator, a plurality of independently operable actuating devices for said setting device, and mechanism for transmitting movements of said actuating devices individually and cumulatively to said setting device, comprising a link, means supporting said link for movement about spaced pivots, means connecting said link with said setting device, and means controlled by said actuating devices for moving said link about respective ones of said pivots.

2. In a calculating machine having an accumulator, a counter, separate actuating mechanisms for said accumulator and said counter, respectively, and a cyclic driving transmission common to said actuating mechanisms; the combination with settable means for reversing the direction of operation of said counter with respect to the direction of operation of said accumulator, of a setting device for said means movable to any of a series of positions and effective upon movement thereof from any of its effective positions to an adjacent effective position for setting said settable means to effect a reversal of the direction of operation of said counter with respect to the direction of operation of said accumulator, a plurality of independently operable actuating devices for said setting device, and mechanism for transmitting movements of said actuating devices individually and cumulatively to said setting device, comprising a link, means supporting said link for movement about spaced pivots, means intermediate said pivots connecting said link with said setting device, and means controlled by said actuating devices for moving said link about respective ones of said pivots.

3. In a calculating machine having an accumulator, a counter, separate actuating mechanisms for said accumulator and said counter, respectively, a cyclic driving transmission common to said actuating mechanisms, and automatic division mechanism including a settable control member; the combination with settable means for reversing the direction of operation of said counter with respect to the direction of operation of said accumulator, of a setting device for said means movable to any of a series of positions and effective upon movement thereof from any of its effective positions to an adjacent effective position for setting said settable means to effect a reversal of the direction of operation of said counter with respect to the direction of operation of said accumulator, an actuating device for said setting device operable independently of said control member, and mechanism for transmitting movements of said actuating device and said control member individually and cumulatively to said setting device, comprising a link, means supporting said link for movement about spaced pivots, means connecting said link with said setting device, means controlled by said actuating device for moving said link about one of said pivots, and means controlled by said control member for moving said link about the other of said pivots.

4. In a calculating machine having an accumulator, a counter, separate actuating mechanisms for said accumulator and said counter, respectively, a cyclic driving transmission common to said actuating mechanisms, and automatic division mechanism including a settable control member; the combination with settable means for reversing the direction of operation of said counter with respect to the direction of operation of said accumulator, of a setting device for said means movable to a series of positions and effective upon movement thereof from any of its effective positions to an adjacent effective position for setting said settable means to effect a reversal of the direction of operation of said counter with respect to the direction of operation of said accumulator, an actuating device for said setting device operable independently of said control member, and mechanism for transmitting movements of said actuating device and said control member individually and cumulatively to said setting device, comprising a link, means supporting said link for movement about spaced pivots, means intermediate said pivots connecting said link with said setting device, means controlled by said actuating device for moving said link about one of said pivots, and means controlled by said control member for moving said link about the other of said pivots.

5. In a calculating machine having an accumulator, a counter, separate actuating mechanisms for said accumulator and said counter, respectively, and a cyclic driving transmission common to said actuating mechanisms; the combination with settable means for reversing the direction of operation of said counter with respect to the direction of operation of said accumulator, comprising a shiftable reversing member, of a cam movable to a series of effective positions and having an operating connection with said shiftable reversing member, a plurality of independently operable actuating devices for said cam, and mechanism for transmitting movements of said devices individually and cumulatively to said cam, comprising a link, means supporting said link for movement about spaced pivots, means connecting said link with said cam, and means controlled by said actuating devices for moving said link about respective ones of said pivots.

6. In a calculating machine having an accumulator, a counter, separate actuating mechanisms for said accumulator and said counter, respectively, and a cyclic driving transmission common to said actuating mechanisms; the combination with settable means for reversing the direction of operation of said counter with respect to the direction of operation of said accumulator, comprising a shiftable reversing member, of a cam movable to a series of effective positions and having an operating connection with said shiftable reversing member, a plurality of independently operable actuating devices for said cam, and mechanism for transmitting movements of said devices individually and cumulatively to said cam, comprising a link, means supporting said link for movement about spaced pivots, means intermediate said pivots connecting said link with said cam, and means controlled by said actuating devices for moving said link about respective ones of said pivots.

7. In a calculating machine having an accumulator, a counter, separate actuating mechanisms for said accumulator and said counter, respectively, a cyclic driving transmission common to said actuating mechanisms, and automatic division mechanism including a settable control member; the combination with settable means for reversing the direction of operation of said counter with respect to the direction of operation of said accumulator, comprising a shiftable reversing member, of a cam movable to a series of effective positions and having an operating connection with said shiftable reversing member, an actuating device for said cam operable independently of said control member, and mechanism for transmitting movements of said actuating device and said control member individually and cumulatively to said cam, comprising a link, means for supporting said link for movement about spaced pivots, means connecting said link with said cam, means controlled by said actuating device for moving said link about one of said pivots, and means controlled by said control member for moving said link about the other of said pivots.

8. In a calculating machine having an accumulator, a counter, separate actuating mechanisms for said accumulator and said counter, respectively, a cyclic driving transmission common to said actuating mechanisms, and automatic division mechanism including a settable control member; the combination with settable means for reversing the direction of operation of said counter with respect to the direction of operation of said accumulator, comprising a shiftable reversing member, of a cam movable to a series of effective positions and having an operating connection with said shiftable reversing member, an actuating device for said cam operable independently of said control member, and mechanism for transmitting movements of said actuating device and said control member individually and cumulatively to said cam, comprising a link, means for supporting said link for movement about spaced pivots, means intermediate said pivots connecting said link with said cam, means controlled by said actuating device for moving said link about one of said pivots, and means controlled by said control member for moving said link about the other of said pivots.

9. In a calculating machine, the combination with a settable automatic division controlling mechanism and a reversible counting mechanism, of means for reversing said counting mechanism comprising a settable control member, means actuated by said automatic division controlling mechanism, upon setting thereof, for setting said control member, yieldable means rendered effective by resetting of said division controlling mechanism for resetting said control member, means thereafter effective during continued operation of the machine for restraining said control member from movement by said yieldable means, and means operable as an incident to termination of operation of the machine for rendering said restraining means ineffective.

10. In a calculating machine, the combination with a settable automatic division controlling mechanism and a reversible counting mechanism, of means for reversing said counting mechanism comprising a settable control member, means comprising a manually settable member for selectively setting said control member, means actuated by said automatic division controlling mechanism for setting said control member from either position to which it has been set by said manually settable member to the other of its positions, yieldable means rendered effective by restoration of said division controlling mechanism for resetting said control member to reverse said counting mechanism, means thereafter effective during continued operation of the machine for retaining said control member in set position, and means operable as an incident to termination of operation of the machine for rendering said retaining means ineffective.

11. In a calculating machine having a reversible counter and automatic division controlling mechanism including a settable control member; the combination with settable means for reversing the direction of operation of said counter, of a setting device for said means movable to any of a series of positions and effective upon movement thereof from any of its effective positions to an adjacent effective position for setting said settable means to effect a reversal of the direction of operation of said counter, an actuating device for said setting device operable independently of said control member, mechanism for transmitting movement of said actuating device and said control member individually and cumulatively to said setting device comprising a link, means supporting said link for movement about spaced pivots, means connecting said link with said setting device, means connecting said actuating device to said link for moving said link about one of said pivots, yieldable means connecting said control member to said link and for moving said link about the other of said pivots, means effective upon retraction of said control member from set position for restraining said link from movement by said yieldable means, and means operable as an incident to termination of operation of the machine for rendering said restraining means ineffective.

12. In a calculating machine having a reversible counting mechanism, and automatic division control mechanism including a settable control member; the combination with settable means for reversing the direction of operation of said counter, of a setting device for said means movable to any of a series of positions and effective upon movement thereof from any of its effective positions to an adjacent effective position for setting said settable means to effect a reversal of the direction of operation of said counter, an actuating device for said setting device operable independently of said control member, and mechanism for transmitting movement of said actuating device and said control member individually and cumulatively to said setting device comprising a link, means supporting said link for movement about spaced pivots, means connecting said link with said setting device, means connecting said actuating device to said link for moving said link about one of said pivots, positively operable means for connecting said control member to said link for moving said link about the other of said pivots upon setting of said control member, yieldable means connecting said control member to said link for moving said link about said other pivot upon retraction of said control member from set position, means effective upon such retraction of said control member for restraining said link from movement by said yieldable means, and means operable as an incident to termination of operation of the machine for rendering said restraining means ineffective.

HAROLD T. AVERY.